US012281198B2

(12) United States Patent
Oyama et al.

(10) Patent No.: US 12,281,198 B2
(45) Date of Patent: *Apr. 22, 2025

(54) THERMOPLASTIC RESIN AND OPTICAL MEMBER

(71) Applicant: TEIJIN LIMITED, Osaka (JP)

(72) Inventors: Tatsuya Oyama, Osaka (JP); Manabu Matsui, Osaka (JP)

(73) Assignee: TEIJIN LIMITED, Osaka (JP)

( * ) Notice: Subject to any disclaimer, the term of this patent is extended or adjusted under 35 U.S.C. 154(b) by 653 days.

This patent is subject to a terminal disclaimer.

(21) Appl. No.: 17/433,821

(22) PCT Filed: Feb. 26, 2020

(86) PCT No.: PCT/JP2020/007828
§ 371 (c)(1),
(2) Date: Aug. 25, 2021

(87) PCT Pub. No.: WO2020/175572
PCT Pub. Date: Sep. 3, 2020

(65) Prior Publication Data
US 2022/0145005 A1  May 12, 2022

(30) Foreign Application Priority Data
Feb. 27, 2019 (JP) ................. 2019-034941

(51) Int. Cl.
C08G 64/06 (2006.01)
C08G 63/197 (2006.01)
C08G 63/199 (2006.01)
C08G 63/64 (2006.01)
C08G 63/668 (2006.01)
C08G 64/30 (2006.01)
G02B 1/04 (2006.01)

(52) U.S. Cl.
CPC ........... C08G 64/06 (2013.01); C08G 63/197 (2013.01); C08G 63/199 (2013.01); C08G 63/64 (2013.01); C08G 63/668 (2013.01); C08G 64/305 (2013.01); C08G 64/307 (2013.01); G02B 1/04 (2013.01)

(58) Field of Classification Search
None
See application file for complete search history.

(56) References Cited

U.S. PATENT DOCUMENTS

| 4,584,335 | A | 4/1986 | Parker |
| 5,532,331 | A | 7/1996 | Bales et al. |
| 5,910,562 | A | 6/1999 | Miura et al. |
| 6,565,974 | B1 | 5/2003 | Uchiyama et al. |
| 11,261,294 | B2 * | 3/2022 | Yamada ............... G02B 13/002 |
| 11,505,698 | B2 * | 11/2022 | Nunome ................. G02B 1/04 |
| 11,566,102 | B2 * | 1/2023 | Yamada ............... C08G 63/672 |
| 2004/0058805 | A1 | 3/2004 | Nakajima et al. |
| 2005/0250930 | A1 | 11/2005 | Ikeda et al. |
| 2007/0149757 | A1 | 6/2007 | Nakajima et al. |
| 2008/0085955 | A1 | 4/2008 | Yanagida et al. |
| 2010/0048855 | A1 | 2/2010 | Kato et al. |
| 2010/0104777 | A1 | 4/2010 | Motoyoshi et al. |
| 2010/0182693 | A1 | 7/2010 | Iida et al. |
| 2012/0120356 | A1 | 5/2012 | Washizu et al. |
| 2012/0123083 | A1 | 5/2012 | Nunome et al. |
| 2012/0308796 | A1 | 12/2012 | Tanaka et al. |
| 2013/0231435 | A1 | 9/2013 | Hironaka et al. |
| 2013/0261283 | A1 | 10/2013 | Motoyoshi et al. |
| 2014/0051300 | A1 | 2/2014 | Yamakami |
| 2014/0268333 | A1 | 9/2014 | Tanaka et al. |

(Continued)

FOREIGN PATENT DOCUMENTS

CN   1711303   12/2005
CN  101680987    3/2010

(Continued)

OTHER PUBLICATIONS

International Search Report issued May 19, 2020 in International (PCT) Application No. PCT/JP2020/007828.
International Search Report issued Mar. 26, 2019 in International (PCT) Patent Application No. PCT/JP2018/048056.
International Search Report issued Aug. 21, 2018 International (PCT) Patent Application No. PCT/JP2018/026613, with translation.
International Search Report issued Oct. 19, 2010 in International (PCT) Application No. PCT/JP2010/062481.
International Preliminary Report on Patentability and Written Opinion issued Feb. 7, 2012 in International (PCT) Application No. PCT/JP2010/062481.

(Continued)

Primary Examiner — David J Buttner
(74) Attorney, Agent, or Firm — WENDEROTH, LIND & PONACK, L.L.P.

(57) ABSTRACT

It is an object of this invention to provide an optical member that is able to cut ultraviolet rays without employing means such as addition of an ultraviolet absorber to the resin, using an ultraviolet cut filter or using ultraviolet absorption coating, as well as a thermoplastic resin to be used for the optical member. The thermoplastic resin of the invention comprises a spatial structural component unit, wherein the spatial structural component unit includes four or more aromatic groups selected from the group consisting of monocyclic aromatic groups and fused polycyclic aromatic groups, the spatial structural component unit has three or more monocyclic aromatic groups and/or heterocyclic aromatic groups in a conjugated structure, or one or more monocyclic aromatic groups and one or more fused polycyclic aromatic groups in a conjugated structure, or two or more fused polycyclic aromatic groups in a conjugated structure, and in a 0.1 mass % dichloromethane solution, the light transmittance at a wavelength of 355 nm is lower than 20% and the light transmittance at a wavelength of 500 nm is 90% or higher.

10 Claims, 2 Drawing Sheets

(56) References Cited

U.S. PATENT DOCUMENTS

| | | | |
|---|---|---|---|
| 2015/0247002 A1* | 9/2015 | Uehara | G02B 1/08 528/370 |
| 2015/0285954 A1 | 10/2015 | Ishizuka et al. | |
| 2016/0319069 A1 | 11/2016 | Shigematsu et al. | |
| 2016/0326311 A1 | 11/2016 | Motoyoshi et al. | |
| 2017/0044312 A1 | 2/2017 | Kato et al. | |
| 2019/0055351 A1 | 2/2019 | Kato et al. | |
| 2019/0241703 A1 | 8/2019 | Kato et al. | |
| 2019/0279980 A1 | 9/2019 | Zhu | |
| 2020/0181325 A1* | 6/2020 | Shiratake | C08G 65/38 |
| 2020/0190259 A1 | 6/2020 | Kato et al. | |
| 2020/0354517 A1* | 11/2020 | Tomonari | C08G 64/305 |

FOREIGN PATENT DOCUMENTS

| | | |
|---|---|---|
| CN | 101965375 | 2/2011 |
| CN | 102257412 | 11/2011 |
| CN | 102352039 | 2/2012 |
| CN | 102630234 | 8/2012 |
| CN | 103201313 | 7/2013 |
| CN | 104263287 | 1/2015 |
| CN | 104769007 | 7/2015 |
| CN | 106029735 | 10/2016 |
| EP | 0 242 465 | 10/1987 |
| EP | 0 787 756 | 8/1997 |
| EP | 1 551 900 | 7/2005 |
| EP | 2 034 337 | 3/2009 |
| EP | 3 677 614 | 7/2020 |
| EP | 3 677 615 | 7/2020 |
| EP | 3 733 734 | 11/2020 |
| EP | 3 747 856 | 12/2020 |
| JP | 63-63718 | 3/1988 |
| JP | 6-145317 | 5/1994 |
| JP | 6-305044 | 11/1994 |
| JP | 6329783 | 11/1994 |
| JP | 7026005 | 1/1995 |
| JP | 7-198901 | 8/1995 |
| JP | 07-509269 | 10/1995 |
| JP | 8-54615 | 2/1996 |
| JP | 08-311189 | 11/1996 |
| JP | 9-268225 | 10/1997 |
| JP | 10-7782 | 1/1998 |
| JP | 10-87800 | 4/1998 |
| JP | 10-101786 | 4/1998 |
| JP | 10-120777 | 5/1998 |
| JP | 11-269259 | 10/1999 |
| JP | 2000-204150 | 7/2000 |
| JP | 2000-212271 | 8/2000 |
| JP | 2000-219736 | 8/2000 |
| JP | 2000-302857 | 10/2000 |
| JP | 2001-72872 | 3/2001 |
| JP | 2001-131276 | 5/2001 |
| JP | 2002-284871 | 10/2002 |
| JP | 2002-309015 | 10/2002 |
| JP | 2002-332345 | 11/2002 |
| JP | 2004-67990 | 3/2004 |
| JP | 2004-523613 | 8/2004 |
| JP | 2005060541 | 3/2005 |
| JP | 2005-187661 | 7/2005 |
| JP | 2005-232252 | 9/2005 |
| JP | 2005-241962 | 9/2005 |
| JP | 2006-028323 | 2/2006 |
| JP | 2007-246629 | 9/2007 |
| JP | 2009-1769 | 1/2009 |
| JP | 2009-80424 | 4/2009 |
| JP | 2009-249307 | 10/2009 |
| JP | 2010-189562 | 9/2010 |
| JP | 2010-275412 | 12/2010 |
| JP | 2012-155193 | 8/2012 |
| JP | 2012-162590 | 8/2012 |
| JP | 2012-214803 | 11/2012 |
| JP | 2013-64119 | 4/2013 |
| JP | 2013-76982 | 4/2013 |
| JP | 2013-523927 | 6/2013 |
| JP | 2014-38772 | 2/2014 |
| JP | 2014-185325 | 10/2014 |
| JP | 2014-205829 | 10/2014 |
| JP | 2014-221865 | 11/2014 |
| JP | 2015-86265 | 5/2015 |
| JP | 2016-69643 | 5/2016 |
| JP | 2017-082038 | 5/2017 |
| JP | 2017-171885 | 9/2017 |
| JP | 2017-179323 | 10/2017 |
| JP | 2017-207759 | 11/2017 |
| JP | 2018-2893 | 1/2018 |
| JP | 2018-2894 | 1/2018 |
| JP | 2018-35228 | 3/2018 |
| JP | 2018-059074 | 4/2018 |
| JP | 2018-59107 | 4/2018 |
| JP | 2018-104691 | 7/2018 |
| JP | 2018-177887 | 11/2018 |
| KR | 10-1532334 | 6/2015 |
| TW | 201815882 | 5/2018 |
| WO | 94/02533 | 2/1994 |
| WO | 02/22707 | 3/2002 |
| WO | 02/055583 | 7/2002 |
| WO | 2004/033529 | 4/2004 |
| WO | 2007/142149 | 12/2007 |
| WO | 2009/058396 | 5/2009 |
| WO | 2011/010741 | 1/2011 |
| WO | 2011/120921 | 10/2011 |
| WO | 2012/099261 | 7/2012 |
| WO | 2014/054710 | 4/2014 |
| WO | 2014/073496 | 5/2014 |
| WO | 2015/170691 | 11/2015 |
| WO | 2017/010318 | 1/2017 |
| WO | 2017/146171 | 8/2017 |
| WO | 2018/008483 | 1/2018 |
| WO | 2018/016516 | 1/2018 |
| WO | 2018/059108 | 4/2018 |
| WO | 2019/043060 | 3/2019 |
| WO | WO2019/044214 | * 3/2019 |
| WO | WO2019/044875 | * 3/2019 |
| WO | WO2019/131841 | * 7/2019 |
| WO | WO2019/151264 | * 8/2019 |

OTHER PUBLICATIONS

International Search Report issued May 25, 2010 in International (PCT) Application No. PCT/JP2010/053711.

International Search Report issued Mar. 31, 2015 in International (PCT) Application No. PCT/JP2015/056272.

Translation of International Preliminary Report on Patentability and Written Opinion of the International Searching Authority issued Sep. 15, 2016 in International (PCT) Application No. PCT/JP2015/056272.

International Search Report issued May 7, 2019 in International (PCT) Application No. PCT/JP2019/011826.

International Search Report issued Jun. 11, 2019 in International (PCT) Application No. PCT/JP2019/009776.

Supplementary European Search Report issued Jan. 3, 2013 in European Application No. 10802361.5.

International Search Report issued May 19, 2020 in International (PCT) Application No. PCT/JP2020/007855.

* cited by examiner

THERMOPLASTIC RESIN AND OPTICAL MEMBER

FIELD

The present invention relates to a thermoplastic resin and to an optical member comprising it.

BACKGROUND

Imaging modules are used in cameras, video cameras, camera-equipped cellular phones, videophones, camera-equipped door phones, and the like. In recent years, downsizing has been a particular requirement for the optical systems used in such imaging modules. However, downsizing of an optical system leads to the major problem of chromatic aberration in the optical system. It is known that chromatic aberration can be compensated for by using a combination of an optical lens material having a high refractive index for the optical lens and a reduced Abbe number for high dispersion, with an optical lens material having a low refractive index and increased Abbe number for low dispersion.

The types of glass conventionally used as materials for optical systems allow the various required optical characteristics to be realized while also having excellent environmental resistance, but their poor workability has been a problem. Therefore, resins that are cheaper than glass materials and have superior workability have come to be used in optical parts. In particular, resins having a fluorene backbone or binaphthalene backbone are used for their high refractive indexes. High refractive index resins, having a refractive index of 1.64 using 9,9-bis(4-(2-hydroxyethoxy)phenyl) fluorene, are described in PTLs 1 and 2, for example. However, their refractive indexes are still insufficient, and even higher refractive indexes are in demand. PTL 3 describes a thermoplastic resin comprising 9,9-bis(4-(2-hydroxyethoxy)-3-phenylphenyl)fluorene.

CITATION LIST

Patent Literature

[PTL 1] International Patent Publication No. 2007/142149
[PTL 2] Japanese Unexamined Patent Publication HEI No. 7-198901
[PTL 3] Japanese Unexamined Patent Publication No. 2015-86265

SUMMARY

Technical Problem

In a conventional imaging module, an ultraviolet absorber is added to the resin, an ultraviolet ray cut filter is used or an ultraviolet absorption coating is used, to block ultraviolet rays from entering the imaging module. Such means are commonly used to cut ultraviolet rays for optical members.

It is an object of the present invention to provide an optical member that can cut ultraviolet rays without using such means, as well as a thermoplastic resin for the same purpose.

Solution to Problem

The present inventors have found that the problem can be solved by an invention having the following aspects.

Aspect 1

A thermoplastic resin comprising a spatial structural component unit, wherein: the spatial structural component unit includes four or more aromatic groups selected from the group consisting of monocyclic aromatic groups and fused polycyclic aromatic groups, the spatial structural component unit has three or more monocyclic aromatic groups in a conjugated structure, or one or more monocyclic aromatic groups and one or more fused polycyclic aromatic groups in a conjugated structure, or two or more fused polycyclic aromatic groups in a conjugated structure, and in a 0.1 mass % dichloromethane solution, the light transmittance at a wavelength of 355 nm is lower than 20% and the light transmittance at a wavelength of 500 nm is 90% or higher.

Aspect 2

The thermoplastic resin according to aspect 1, which contains the spatial structural component unit at 10 mol % or greater of the total units.

Aspect 3

The thermoplastic resin according to aspect 1 or 2, wherein the spatial structural component unit has a fluorene-based component unit or anthrone-based component unit including an aromatic substituent on a side chain, and/or a binaphthalene-based component unit including an aromatic substituent.

Aspect 4

The thermoplastic resin according to any one of aspects 1 to 3, which contains a repeating unit represented by the following formula (1):

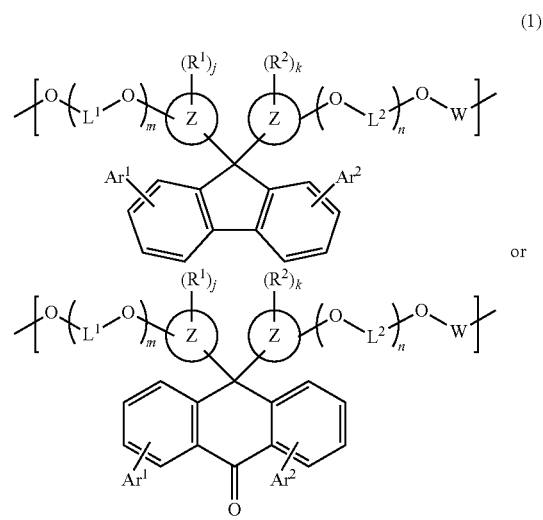

Where the rings Z represent (the same or different) aromatic hydrocarbon rings, $R^1$ and $R^2$ each independently represent a hydrogen atom, a halogen atom or a hydrocarbon group of 1 to 12 carbon atoms optionally containing an aromatic group, Ar¹ and Ar² each independently represent an aromatic group optionally containing a substituent, L¹ and L² each independently represent a divalent linking group, j and k each independently represent an integer of 0 or greater, m and n each independently represent 0 or 1, and W is at least one group selected from groups represented by the following formula (2) or (3).

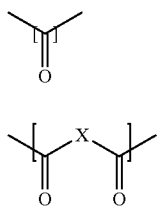
(2)

(3)

In the formula, X represents a divalent linking group.

Aspect 5

The thermoplastic resin according to aspect 4, wherein formula (1) is at least one selected from the group consisting of units represented by the following formula (1b) or (1c).

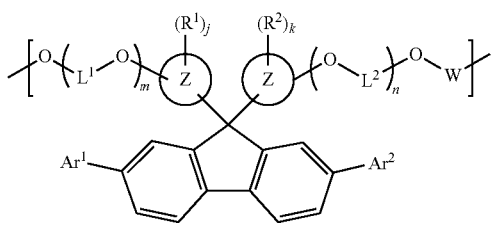
(1b)

or

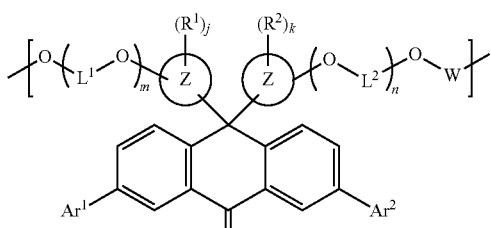

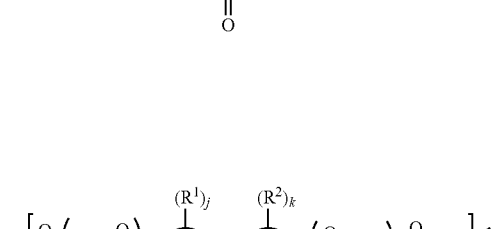
(1c)

or

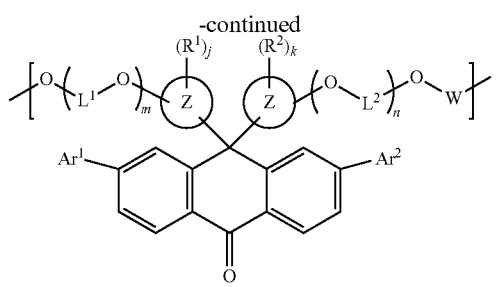

In the formulas, Ar¹ and Ar², L¹ and L², R¹ and R², j, k, m, n and W are the same as the respective symbols in formula (1).

Aspect 6

The thermoplastic resin according to aspect 4 or 5, wherein Z in formula (1) represents benzene or naphthalene.

Aspect 7

The thermoplastic resin according to any one of aspects 1 to 6, which contains a repeating unit represented by the following formula (9):

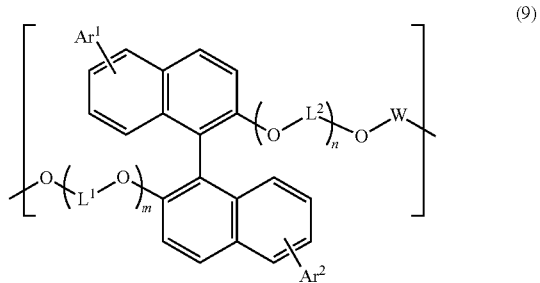
(9)

In the formula, Ar¹ and Ar², L¹ and L², m and n and W are the same as in formula (1) above.

Aspect 8

The thermoplastic resin according to aspect 7, wherein formula (9) is selected from the group consisting of units represented by the following formula (9-1).

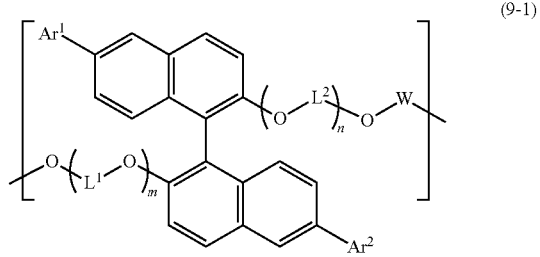
(9-1)

In the formula, Ar¹ and Ar², L¹ and L², m and n and W are the same as in formula (1) above.

Aspect 9

The thermoplastic resin according to any one of aspects 1 to 8, wherein the refractive index nD is 1.640 or greater.

Aspect 10

The thermoplastic resin according to any one of aspects 1 to 9, wherein the specific viscosity is 0.12 to 0.40.

Aspect 11

The thermoplastic resin according to any one of aspects 1 to 10, wherein the glass transition temperature is 130 to 170° C.

Aspect 12

The thermoplastic resin according to any one of aspects 1 to 11, which is a polyester, polyester carbonate or polycarbonate.

Aspect 13

An optical member comprising a thermoplastic resin according to any one of aspects 1 to 12.

Aspect 14

The optical member according to aspect 13, which is an optical lens.

DESCRIPTION OF EMBODIMENTS

<Thermoplastic Resin>

Figure 1:
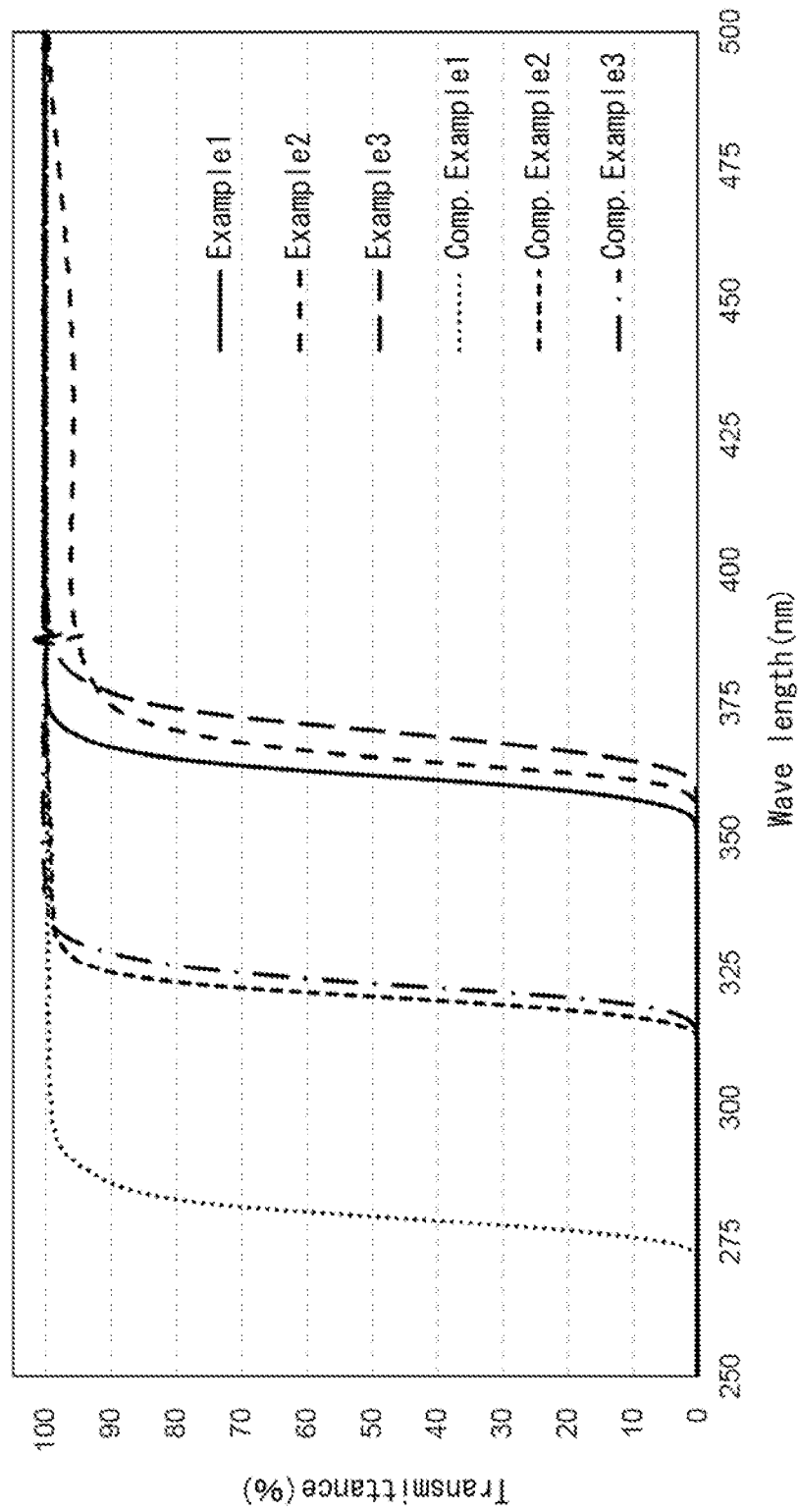
FIG. 1 is a transmission spectrum for 0.1 mass % dichloromethane solutions of the thermoplastic resins of Examples 1 to 3 and Comparative Examples 1 to 3.

The thermoplastic resin of the invention comprises a spatial structural component unit, wherein:

the spatial structural component unit includes four or more aromatic groups selected from the group consisting of monocyclic aromatic groups and fused polycyclic aromatic groups, the spatial structural component unit has three or more monocyclic aromatic groups in a conjugated structure, or one or more monocyclic aromatic groups and one or more fused polycyclic aromatic groups in a conjugated structure, or two or more fused polycyclic aromatic groups in a conjugated structure, and in a 0.1 mass % dichloromethane solution, the light transmittance at a wavelength of 355 nm is lower than 20% and the light transmittance at a wavelength of 500 nm is 90% or higher.

The present inventors have found that if the resin comprises a spatial structural component unit with extremely high bulk, including a monocyclic aromatic group and/or a fused polycyclic aromatic group, and at least a portion thereof forms a conjugated structure as mentioned above, then the resin can exhibit very high ultraviolet absorbing properties and visible light transparency. When such a resin is used to form an optical lens, since the resin itself exhibits a property of blocking ultraviolet rays it is not necessary to include an ultraviolet absorber in the resin, or to use an ultraviolet cut filter or to use an ultraviolet absorption coating, and it is therefore useful to help prevent incidence of ultraviolet rays into imaging modules.

<Physical Properties of Thermoplastic Resin>

In a 0.1 mass % dichloromethane solution, the thermoplastic resin of the invention has a light transmittance lower than 20%, and preferably 15% or lower, 10% or lower or 5% or lower, at a wavelength of 355 nm. A thermoplastic resin including the aforementioned spatial structural component unit has a longer wavelength shift for the absorption wavelength in solid state than in solution. Therefore, if the light transmittance at 355 nm is lower than 20% in solution it is possible to effectively block wavelengths of 200 to 380 nm, which are in the near-ultraviolet region, when in solid state such as an optical lens. The thermoplastic resin of the invention has such a low transmittance for ultraviolet rays essentially without addition of any of the ultraviolet absorbers that are known in the field of optical lenses, and it is therefore highly advantageous.

In a 0.1 mass % dichloromethane solution, the thermoplastic resin of the invention has a light transmittance of 90% or higher, and preferably 92% or higher, 94% or higher, 96% or higher or 98% or higher, at a wavelength of 500 nm. The thermoplastic resin of the invention is highly advantageous because it also has very high visible light transparency while also exhibiting the aforementioned low ultraviolet transmittance.

The refractive index (nD) of the thermoplastic resin of the invention at a wavelength of 589 nm, measured at 25° C., is 1.630 or greater, for example. The refractive index (nD) may be 1.640 or greater, 1.650 or greater, 1.660 or greater, 1.670 or greater, 1.680 or greater, 1.690 or greater, 1.700 or greater or 1.710 or greater, and 1.770 or lower, 1.750 or lower, 1.730 or lower, 1.710 or lower, 1.700 or lower, 1.695 or lower or 1.690 or lower. For example, the refractive index (nD) may be 1.640 to 1.770, 1.670 to 1.750 or 1.680 to 1.730.

As used herein, the "Abbe number (ν)" is the value calculated from the refractive indexes measured at wavelengths of 486 nm, 589 nm and 656 nm at 25° C., using the following formula, the values being measured by the method described in the Examples:

$$\nu = (nD-1)/(nF-nC)$$

where nD is the refractive index at a wavelength of 589 nm, nC is the refractive index at a wavelength of 656 nm and nF is the refractive index at a wavelength of 486 nm.

The Abbe number (ν) of the thermoplastic resin is 25.0 or lower, for example. The Abbe number (ν) may be 24.0 or lower, 22.0 or lower, 20.0 or lower, 18.0 or lower, 17.0 or lower, 16.0 or lower or 15.0 or lower, and 10.0 or higher, 11.0 or higher, 12.0 or higher, 13.0 or higher, 14.0 or higher, 15.0 or higher or 16.0 or higher. For example, the Abbe number (ν) may be 10.0 to 25.0, 11.0 to 22.0 or 14.0 to 18.0.

The thermoplastic resin has a low degree of coloration, and particularly a yellowish color. Specifically, the b* value according to the CIE1976 (L*a*b*) color system is 10.0 or lower and preferably 8.0 or lower, 6.0 or lower, 5.0 or lower or 3.0 or lower, and it may be 0.01 or higher, 0.1 or higher, 1.0 or higher or 3.0 or higher. For example, the b* value may be 0.01 to 10.0 or 0.1 to 5.0. The b* value is the value in the CIE1976 (L*a*b*) color system, measured with a spectrophotometer for a solution of 1.0 g dissolved in 5 ml of dichloromethane (a solution dissolved at 13 mass % in dichloromethane).

Although palladium catalysts are used for synthesizing starting materials for thermoplastic resins for optical lenses, the present inventors have found that the residual amount of palladium catalyst in the starting material is connected with coloration of the thermoplastic resin. The present inventors have also found that a useful optical lens can be obtained by using a thermoplastic resin as described above, having the residual amount of palladium catalyst adjusted.

The glass transition temperature of the thermoplastic resin, when measured at a temperature-elevating rate of 20° C./min using a DSC-60A by Shimadzu Corp., may be 120° C. or higher, 130° C. or higher, 140° C. or higher, 150° C. or higher or 160° C. or higher, and 190° C. or lower, 180° C. or lower, 170° C. or lower or 160° C. or lower. For example, the glass transition temperature may be 120° C. to 190° C. or 130° C. to 170° C. The glass transition temperature is preferably within this range as the balance between heat resistance and moldability will be excellent.

The specific viscosity of the thermoplastic resin may be 0.10 or higher, 0.12 or higher, 0.15 or higher, 0.18 or higher, 0.20 or higher or 0.25 or higher, and 0.5 or lower, 0.45 or lower, 0.4 or lower, 0.35 or lower or 0.3 or lower. For example, the specific viscosity may be 0.12 to 0.40, 0.15 to 0.35 or 0.18 to 0.30. The specific viscosity is preferably within this range as the balance between moldability and mechanical strength will be excellent. The specific viscosity is measured at 20° C., using a solution of 0.7 g of the resin obtained upon completion of polymerization, in 100 ml of dichloromethane (a solution dissolved to 0.5 mass % in dichloromethane).

<Structure of Thermoplastic Resin>

The thermoplastic resin of the invention may be a polyester, a polyester carbonate or a polycarbonate.

A thermoplastic resin having such a refractive index and ultraviolet absorption preferably includes a spatial structural component unit, the spatial structural component unit preferably including four or more aromatic groups selected from the group consisting of monocyclic aromatic groups and fused polycyclic aromatic groups, and the spatial structural component unit most preferably having a fluorene-based component unit or anthrone-based component unit that includes an aromatic substituent on a side chain and/or a binaphthalene-based component unit that includes an aromatic substituent. Such a fluorene-based component unit or anthrone-based component unit and binaphthalene-based component unit can be obtained by reacting an organometallic compound (such as a boronic acid aromatic compound) with a fluorene-based, anthrone-based or binaphthalene-based halide (such as a bromide) using a transition metal catalyst (such as a platinum element-based catalyst, and especially a palladium-based catalyst).

The spatial structural component unit of the thermoplastic resin of the invention is a conjugated structure of three or more monocyclic aromatic groups, or a conjugated structure of one or more monocyclic aromatic groups and one or more fused polycyclic aromatic groups, or a conjugated structure of two or more fused polycyclic aromatic groups. In this case, the monocyclic aromatic groups and fused polycyclic aromatic groups preferably form conjugated bonds each with a single bond. When the conjugated structure is thus spread out, ultraviolet rays can be absorbed and high visible light permeability tends to be exhibited.

For the present purpose, a conjugated structure is defined as a conjugated structure where the π electrons of an aromatic group or multiple bonds are delocalized.

Unless otherwise specified, the term "aromatic group" as used herein is not limited to aromatic groups formed from carbon atoms and hydrogen atoms alone, and encompasses heteroatom-containing heterocyclic aromatic groups as well. Heteroatoms include oxygen atoms, sulfur atoms and nitrogen atoms. The term "aromatic group" also includes monocyclic aromatic groups and fused polycyclic aromatic groups, unless otherwise specified.

For example, the thermoplastic resin of the invention may contain a spatial structural component unit as described above at 10 mol % or greater, 20 mol % or greater, 30 mol % or greater, 40 mol % or greater, 50 mol % or greater, 60 mol % or greater or 70 mol % or greater, and 100 mol % or lower, 90 mol % or lower, 80 mol % or lower, 70 mol % or lower, 60 mol % or lower, 50 mol % or lower or 40 mol % or lower. For example, the thermoplastic resin may include such a spatial structural component unit at 10 mol % to 100 mol % or 20 mol % to 80 mol %.

Examples of fluorene-based component units or anthrone-based component units having aromatic substituents on side chains include repeating units represented by the following formula (1).

(Repeating Units of Formula (1))

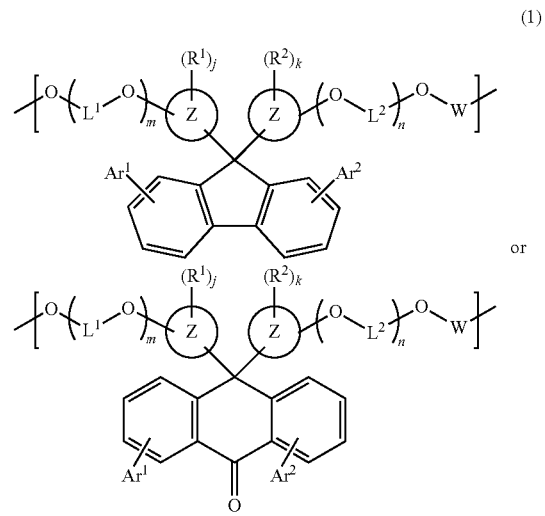

In the formulas, ring Z represents the same or different aromatic hydrocarbon rings, $R^1$ and $R^2$ each independently represent a hydrogen atom, a halogen atom or a hydrocarbon group of 1 to 12 carbon atoms optionally containing an aromatic group, $Ar^1$ and $Ar^2$ each represent an aromatic group optionally containing a substituent, $L^1$ and $L^2$ each independently represent a divalent linking group, j and k each independently represent an integer of 0 or greater, m and n each independently represent 0 or 1, and W is at least one group selected from groups represented by the following formula (2) or (3).

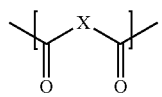

In the formula, X represents a divalent linking group.

The repeating unit represented by formula (1) is most preferably a unit represented by the following formula (1b) or (1c).

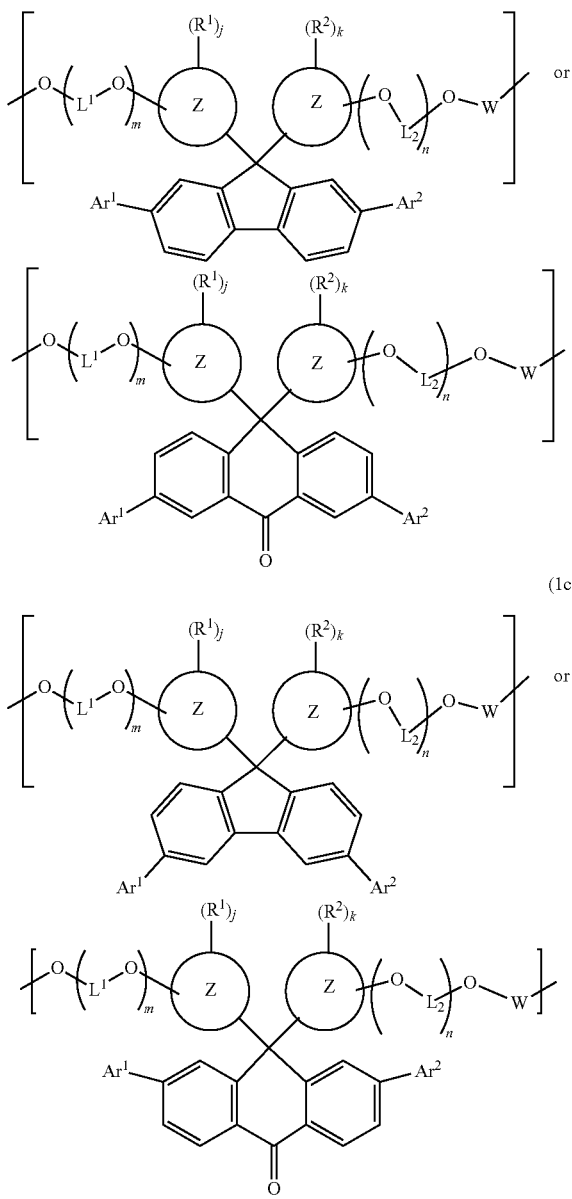

(1b)

(1c)

A conjugated structure is not formed between the two benzene rings which are monocyclic aromatic groups included in fluorene or anthrone, and the ring Z situated on the main chain. In the repeating unit of formula (1), a conjugated structure is formed between at least the monocyclic aromatic group of the fluorene or anthrone and $Ar^1$ and/or $Ar^2$.

The aromatic hydrocarbon ring represented by ring Z in formula (1) may be a benzene ring or a fused polycyclic aromatic hydrocarbon ring having at least a benzene ring backbone, with preferred examples being fused bi- to tetracyclic hydrocarbon rings such as fused bicyclic hydrocarbon rings and fused tricyclic hydrocarbon rings.

A fused bicyclic hydrocarbon ring is preferably $C_{8-20}$, such as an indene ring or naphthalene ring, with $C_{10-16}$ fused bicyclic hydrocarbon rings being more preferred. A fused tricyclic hydrocarbon ring is preferably an anthracene ring or phenanthrene ring.

A benzene ring or naphthalene ring is preferred for the ring Z.

Among specific examples of aromatic hydrocarbon rings represented by ring Z in formula (1), 1,4-phenylene, 1,4-naphthalenediyl and 2,6-naphthalenediyl groups are preferred and 1,4-phenylene and 2,6-naphthalenediyl groups are more preferred.

In formula (1), $R^1$ and $R^2$ each independently represent a hydrogen atom, a halogen atom or a hydrocarbon group optionally containing an aromatic group of 1 to 12 carbon atoms, with a hydrogen atom, a methyl group or a phenyl group being preferred.

Examples of hydrocarbon groups represented by $R^1$ and $R^2$ in formula (1) include alkyl, cycloalkyl, aryl, naphthyl and aralkyl groups.

Specific preferred examples of alkyl groups include $C_{1-6}$ alkyl groups, $C_{1-4}$ alkyl groups or $C_{1-3}$ alkyl groups such as methyl, ethyl, propyl, isopropyl, butyl and t-butyl groups, with $C_{1-4}$ alkyl groups and $C_{1-3}$ alkyl groups being preferred, $C_{1-3}$ alkyl groups being more preferred and methyl and ethyl groups being even more preferred.

Specific preferred examples of cycloalkyl groups include $C_{5-8}$ cycloalkyl groups and $C_{5-6}$ cycloalkyl groups such as cyclopentyl and cyclohexyl groups, with $C_{5-6}$ cycloalkyl groups being preferred.

Preferred among specific examples of aryl groups are phenyl and alkylphenyl groups (such as mono- or dimethylphenyl, tolyl, 2-methylphenyl and xylyl groups), with phenyl groups being more preferred.

Specific preferred examples of naphthyl groups include 1-naphthyl and 2-naphthyl groups.

Specific preferred examples of aralkyl groups include $C_{6-10}$ aryl-$C_{1-4}$ alkyl groups such as benzyl and phenethyl groups.

Preferred halogen atoms are fluorine, chlorine and bromine.

In formula (1), $Ar^1$ and $Ar^2$ may each independently represent a monocyclic aromatic group or fused polycyclic aromatic group of 1 to 10 carbon atoms optionally having a substituent, or a 5- or 6-membered heterocyclic aromatic group optionally having a substituent, or a fused heterocyclic aromatic group containing it, where the aromatic group of 1 to 10 carbon atoms is preferably an optionally substituted thienyl, phenyl or naphthyl group, and more preferably a phenyl or naphthyl group. In the case of a naphthyl group, a 1-naphthyl group or 2-naphthyl group is preferred, and a 2-naphthyl group is more preferred. The bonding positions of $Ar^1$ and $Ar^2$ are the 2-position and 7-position, preferably the 3-position and 6-position and more preferably the 2-position and 7-position of the fluorene backbone or anthrone backbone. The heterocyclic aromatic group is preferably a 5- or 6-membered heterocyclic aromatic group or a fused heterocyclic aromatic group containing it, with heteroatoms including oxygen, sulfur and nitrogen atoms, and especially sulfur atom.

PTL 3 describes a thermoplastic resin obtained using 9,9-bis(4-(2-hydroxyethoxy)-3-phenylphenyl)fluorene having the following formula (hereunder referred to as "BOPPEF").

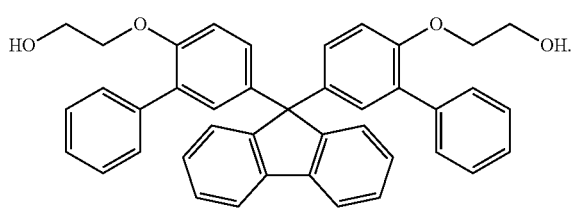 [SMILES: OCCOc1ccc(C2(c3ccc(OCCO)c(-c4ccccc4)c3)c3ccccc3-c3ccccc32)cc1-c1ccccc1]

The polymer described in PTL 3 has an aromatic group introduced into the main chain of a fluorene backbone polymer, but the present inventors have found that the absorption wavelength of a polymer having an aromatic group introduced into a side chain of a fluorene backbone polymer is a much longer wavelength compared to the absorption wavelength of the polymer described in PTL 3. It was very surprising to discover that the difference between including an aromatic group in the main chain portion and including it in a side chain portion results in an absorption wavelength difference of about 40 nm. (FIG. 1)

The reason for this is believed to be as follows.

When an aromatic group is introduced into the side chain portion of the polymer, i.e. fluorene, the monocyclic aromatic group of the fluorene and the introduced aromatic group form a conjugated structure as mentioned above, and the π electrons become delocalized through the side chain. This significantly lowers the electron transition energy and results in a longer absorption wavelength. When an aromatic group is introduced into the polymer main chain, on the other hand, formation of the conjugated structure stops at one part of the main chain and almost no lowering of the electron transition energy takes place, such that the absorption wavelength is essentially not lowered by introduction of the aromatic group. This can be applied not only to polymers with fluorene backbones but also to polymers with anthrone backbones.

The present inventors have also found that, among the aromatic groups of $Ar^1$ and $Ar^2$, naphthyl groups impart an even longer absorption wavelength compared to phenyl groups. The effect of lengthening the absorption wavelength was also found to differ significantly depending on the type of naphthyl group (1-naphthyl or 2-naphthyl group). The reason for this is believed to be that the overall conjugated state of the side chains containing the fluorene or anthrone portions differs because steric hindrance is produced depending on differences in the bonding positions of the naphthyl groups. In other words, it is thought that the lengthening of about 15 nm for the absorption wavelength was seen because the conjugated state between a 2-naphthyl group and fluorene has the π electrons more delocalized than in the conjugated state between a 1-naphthyl group and fluorene. The difference between the conjugated states also significantly affects the refractive index and birefringence. This can be applied not only to polymers with fluorene backbones but also to polymers with anthrone backbones.

In addition, since it has a fluorene backbone or anthrone backbone with introduced aromatic groups, the heat resistance can be increased and a balance between birefringence and moldability can be obtained.

In formula (1), $L^1$ and $L^2$ each independently represent a divalent linking group, which is preferably an alkylene group of 1 to 12 carbon atoms, and more preferably an ethylene group. By adjusting the lengths of the linking groups $L^1$ and $L^2$, it is possible to adjust the glass transition temperature of the resin.

In formula (1), W is at least one group selected from groups represented by formula (2) or (3) above. When W is formula (2), formula (1) will be a carbonate unit, and when W is formula (3), formula (1) will be an ester unit.

The repeating unit represented by formula (1) is preferably included at a minimum of 5 mol %, 10 mol % or greater, 20 mol % or greater, 30 mol % or greater, 40 mol % or greater, 50 mol % or greater, 60 mol % or greater or 70 mol % or greater, based on the total repeating units. The repeating unit represented by formula (1) is preferably in this range as the refractive index will be high. It is also preferably included at a maximum of no greater than 100 mol %, no greater than 90 mol %, no greater than 80 mol %, no greater than 70 mol %, no greater than 60 mol %, no greater than 50 mol % or no greater than 40 mol %. If the repeating unit represented by formula (1) is in this range, it will be easier to obtain a resin with ultraviolet absorbing properties and visible light transparency, as well as a high refractive index, low birefringence, and balance between heat resistance and moldability.

In formula (3), X represents a divalent linking group, preferably a hydrocarbon group optionally containing an aromatic group of 1 to 30 carbon atoms, and more preferably phenylene, naphthalenediyl or a group represented by the following formula (4) or formula (5).

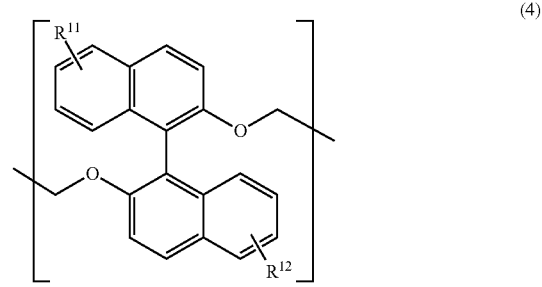

(4)

In the formula, $R^{11}$ and $R^{12}$ each independently represent a hydrogen atom, a hydrocarbon group of 1 to 12 carbon atoms optionally containing an aromatic group, or a halogen atom.

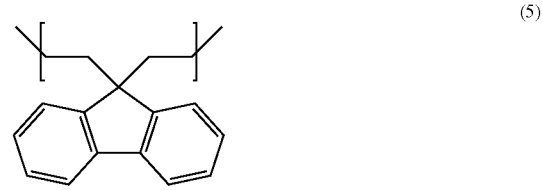

(5)

(Repeating Units of Formulas (6) to (8))

A thermoplastic resin to be used in the optical lens of the invention may include at least one selected from the group consisting of units represented by the following formulas (6) to (8), as a repeating unit.

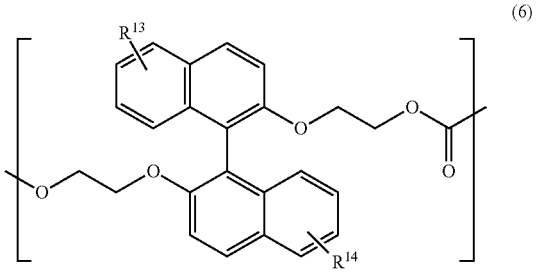

(In the formula, $R^{13}$ and $R^{14}$ each independently represent a hydrogen atom, a hydrocarbon group of 1 to 12 carbon atoms optionally containing an aromatic group, or a halogen atom.)

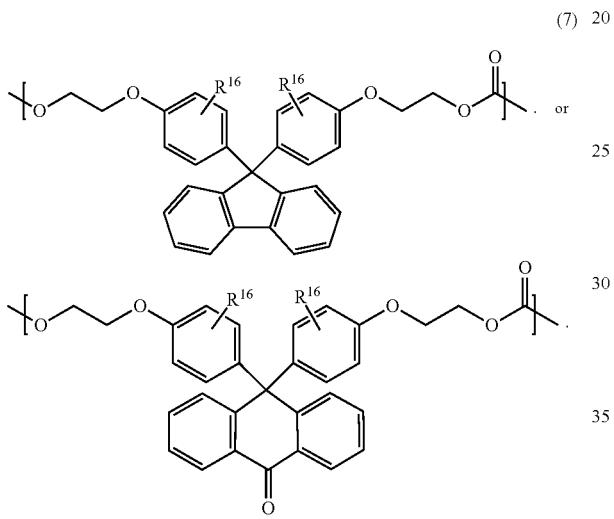

In the formula, $R^{15}$ and $R^{16}$ each independently represent a hydrogen atom, a hydrocarbon group of 1 to 12 carbon atoms optionally containing an aromatic group, or a halogen atom.

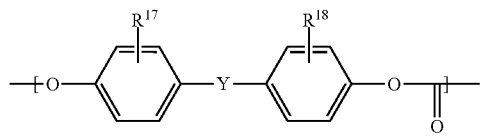

In the formula, $R^{17}$ and $R^{18}$ each independently represent a hydrogen atom, a hydrocarbon group of 1 to 12 carbon atoms optionally containing an aromatic group, or a halogen atom, and Y is a single bond or a divalent linking group.

When the thermoplastic resin of the invention includes at least one group selected from the group consisting of units represented by formulas (6) to (8) as a repeating unit, the molar ratio of repeating units, between the repeating unit represented by formula (1) and the group comprising units represented by formulas (6) to (8), is preferably 95:5 to 5:95, and more preferably 90:10 to 10:90, 80:20 to 20:80 or 70:30 to 30:70. If the molar ratio between repeating units represented by formula (1) and at least one repeating unit selected from the group consisting of units represented by formulas (6) to (8) is within this range, it will be easier to obtain a resin with a high refractive index, low birefringence, and balance between heat resistance and moldability.

In formulas (6) to (8), $R^{13}$ to $R^{18}$ each independently represent a hydrogen atom, a hydrocarbon group of 1 to 12 carbon atoms optionally containing an aromatic group, or a halogen atom, and it may be a hydrogen atom or phenyl group, in particular. Y is a single bond or a divalent linking group, and it may be a divalent hydrocarbon group of 1 to 12 carbon atoms, an oxygen atom or a sulfur atom, for example.

Examples of binaphthalene-based component units containing aromatic substituents include repeating units represented by the following formula (9).

(Repeating Units of Formula (9))

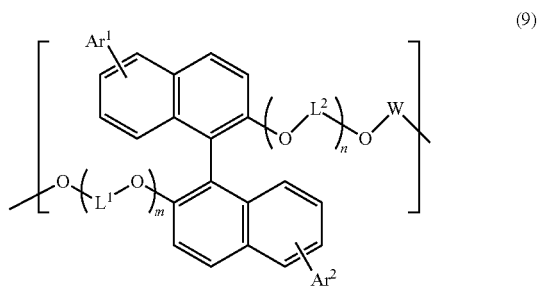

Here, $L^1$, $L^2$, W, m, n, $Ar^1$ and $Ar^2$ are the same as in formula (1). Since the two naphthyl groups in the binaphthalene structure are essentially orthogonal, the π electrons are not delocalized between the naphthyl groups without forming a conjugated structure, and therefore a conjugated structure is formed between the naphthyl groups and $Ar^1$ or $Ar^2$.

Most preferred among repeating units of formula (9) are repeating units of formula (9-1) in which $Ar^1$ and $Ar^2$ are positioned as shown below, because a conjugated structure will form more easily between the naphthyl groups and $Ar^1$ and $Ar^2$.

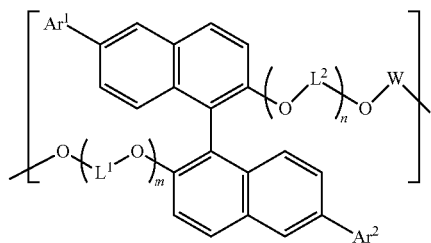

The repeating unit represented by formula (9) is preferably included at a minimum of 5 mol %, 10 mol % or greater, 20 mol % or greater, 30 mol % or greater, 40 mol % or greater, 50 mol % or greater, 60 mol % or greater or 70 mol % or greater, based on the total repeating units. The repeating unit represented by formula (9) is preferably in this range as the refractive index will be high. It is also preferably included at a maximum of no greater than 100 mol %, no greater than 90 mol %, no greater than 80 mol %, no greater than 70 mol %, no greater than 60 mol %, no greater than 50 mol % or no greater than 40 mol %. If the repeating unit represented by formula (9) is in this range, it will be easier to obtain a resin with ultraviolet absorbing properties and visible light transparency, as well as a high refractive index, low birefringence, and balance between heat resistance and moldability.

(Other Repeating Unit)

The thermoplastic resin may also have another repeating unit so long as the properties according to the invention are not impaired. The other repeating unit preferably constitutes less than 30 mol %, 20 mol % or less, 10 mol % or less or 5 mol % or less of the total repeating units.

<Starting Materials for Thermoplastic Resin>

(Diol Component of Formula (1))

The diol component as the starting material of formula (1) for the invention is primarily a diol component represented by formula (a), and a single type may be used alone or two or more different types may be used in combination.

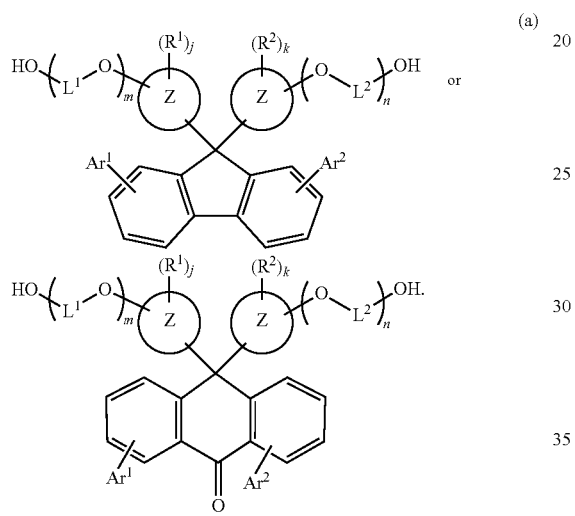

In formula (a), ring Z, $R^1$, $R^2$, $Ar^1$, $Ar^2$, $L^1$, $L^2$, j, k, m and n are the same as the respective symbols in formula (1). These compounds have two monocyclic aromatic groups of the fluorene backbone or anthrone backbone in a conjugated structure, the conjugated structure being preferred because both $Ar^1$ and $Ar^2$ which are bonded by single bonds to the two monocyclic aromatic groups form a structure with further spread out conjugation.

Specific representative examples of diol components represented by formula (a) will now be listed, with the understanding that the starting materials to be used in formula (1) are not limited to these.

When $Ar^1$ and $Ar^2$ are phenyl groups, compounds represented by the following formulas (a1) to (a4) (formula (a1): 9,9-bis(4-(2-hydroxyethoxy)phenyl)-2,7-diphenylfluorene (hereunder also referred to as "BPDP2"), formula (a2): 9,9-bis(4-(2-hydroxyethoxy)phenyl)-3,6-diphenylfluorene (hereunder also referred to as "BPDP3"), formula (a3): 9,9-bis(4-hydroxyphenyl)-2,7-diphenylfluorene, formula (a4): 9,9-bis(4-hydroxyphenyl)-3,6-diphenylfluorene, and their corresponding anthrone compounds) are more preferred, with formula (a1): BPDP2 and formula (a3): 9,9-bis(4-hydroxyphenyl)-2,7-diphenylfluorene, and their corresponding anthrone compounds, being especially preferred.

These may be used alone or in combinations of two or more. Substituents may also be present in the phenyl groups of $Ar^1$ and $Ar^2$.

When $Ar^1$ and $Ar^2$ are naphthyl groups, the following formula (a5): 9,9-bis(4-(2-hydroxyethoxy)phenyl)-2,7-di(1-naphthyl)fluorene, formula (a6): 9,9-bis(4-(2-hydroxyethoxy)phenyl)-3,6-di(1-naphthyl)fluorene, formula (a7): 9,9-bis(4-hydroxyphenyl)-2,7-di(1-naphthyl)fluorene, formula (a8): 9,9-bis(4-hydroxyphenyl)-3,6-di(1-naphthyl) fluorene, formula (a9): 9,9-bis(4-(2-hydroxyethoxy)phenyl)-2,7-di(2-naphthyl)fluorene, formula (a10): 9,9-bis(4-(2-hydroxyethoxy)phenyl)-3,6-di(2-naphthyl)fluorene, formula (a11): 9,9-bis(4-hydroxyphenyl)-2,7-di(2-naphthyl)fluorene and formula (a12): 9,9-bis(4-hydroxyphenyl)-3,6-di(2-naphthyl)fluorene, and their corresponding anthrone compounds, are more preferred.

Particularly preferred are compounds represented by formula (a5): 9,9-bis(4-(2-hydroxyethoxy)phenyl)-2,7-di(1-naphthyl)fluorene (hereunder also referred to as "BPDN1"), formula (a7): 9,9-bis(4-hydroxyphenyl)-2,7-di(1-naphthyl) fluorene, formula (a9): 9,9-bis(4-(2-hydroxyethoxy)phenyl)-2,7-di(2-naphthyl)fluorene (hereunder also referred to as as "BPDN2") and formula (a11): 9,9-bis(4-hydroxyphenyl)-2,7-di(2-naphthyl)fluorene, and their corresponding anthrone compounds.

These may be used alone or in combinations of two or more. Substituents may also be present in the naphthyl groups of Ar¹ and Ar².

(a5)
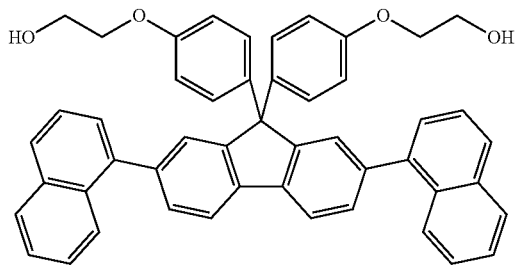

(a6)
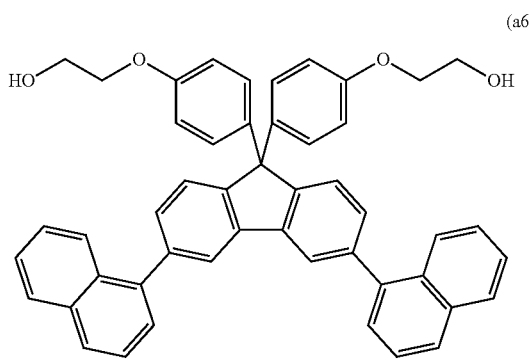

(a7)
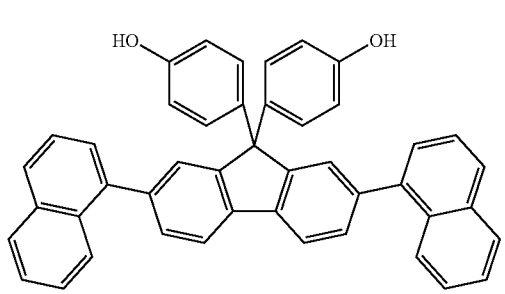

(a8)
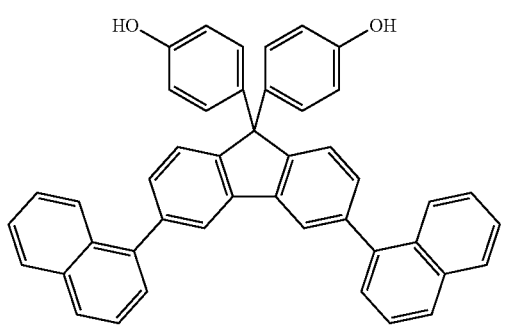

(a9)
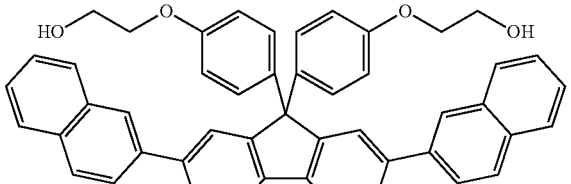

(a10)
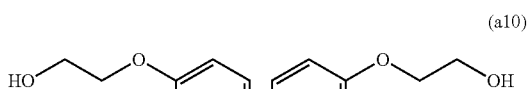

(a11)
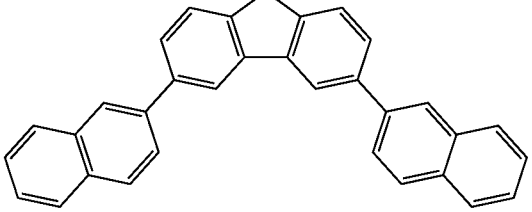

(a12)
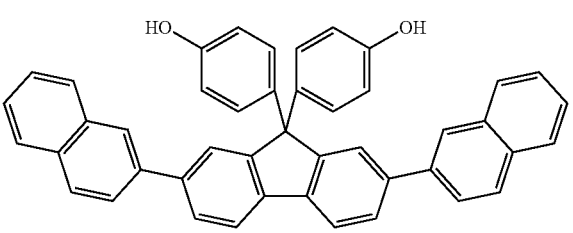

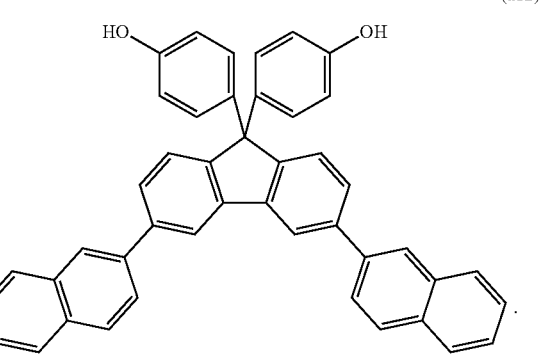

When Ar¹ and Ar² are heterocyclic aromatic groups, the diol component as formula (a) may be 9,9-bis(4-(2-hydroxyethoxy)phenyl)-2,7-di(2-thienyl)fluorene represented by the following formula (a13), for example (hereunder also referred to as "BPDT2"):

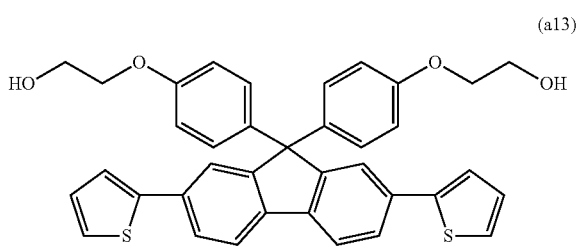 [SMILES: OCCOc1ccc(C2(c3ccc(OCCO)cc3)c3cc(-c4cccs4)ccc3-c3ccc(-c4cccs4)cc32)cc1]

(a13)

The diol is preferred because it has the two monocyclic aromatic groups of the fluorene backbone and the heterocyclic aromatic groups bonded to them each by one single bond, forming a spread-out conjugated structure overall.

When ring Z is a naphthalene ring, examples of compounds include 9,9-bis(6-(2-hydroxyethoxy)-2-naphthyl)-2,7-diphenylfluorene represented by formula (a14) (hereunder also referred to as "BNDP2") and 9,9-bis(6-(2-hydroxyethoxy)-2-naphthyl)-2,7-di(2-naphthyl)fluorene represented by formula (a15) (hereunder also referred to as "BNDN2"), and their corresponding anthrone compounds.

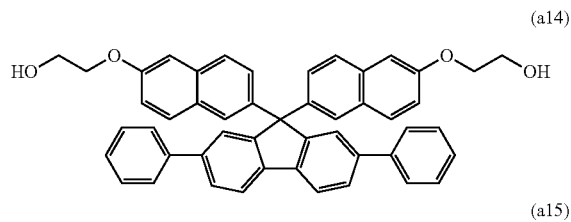

(a14)

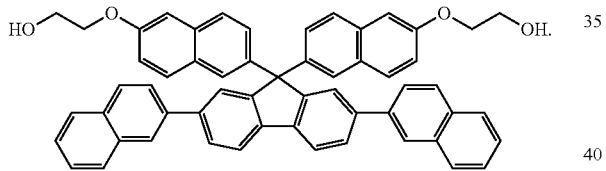

(a15)

These are preferred because they have the two monocyclic aromatic groups of the fluorene backbone or anthrone backbone and the monocyclic aromatic group or fused polycyclic aromatic group bonded each by one single bond, forming a conjugated structure overall.

(Diol Components of Formulas (6) to (8))

The thermoplastic resin may also have a repeating unit represented by formulas (6) to (8), the following being diol components as starting materials of formulas (6) to (8). These may be used alone or in combinations of two or more.

Diol components as starting materials for formula (6) include 2,2'-bis(2-hydroxyethoxy)-3,3'-dimethyl-1,1'-binaphthalene, 2,2'-bis(2-hydroxyethoxy)-6,6'-dimethyl-1,1'-binaphthalene, 2,2'-bis(2-hydroxyethoxy)-7,7'-dimethyl-1,1'-binaphthalene and 2,2'-bis(2-hydroxyethoxy)-1,1'-binaphthalene.

Examples of diol components as starting materials for formula (7) include 9,9-bis(4-(2-hydroxyethoxy)phenyl)fluorene, 9,9-bis(4-(2-hydroxyethoxy)-3-methylphenyl)fluorene, 9,9-bis(4-(2-hydroxyethoxy)-3-cyclohexylphenyl)fluorene and 9,9-bis(4-(2-hydroxyethoxy)-3-phenylphenyl)fluorene, and their corresponding anthrone compounds, with 9,9-bis(4-(2-hydroxyethoxy)phenyl)fluorene and 9,9-bis(4-(2-hydroxyethoxy)-3-phenylphenyl)fluorene and their corresponding anthrone compounds being particularly preferred. These may be used alone or in combinations of two or more.

Examples of diol components as starting materials of formula (8) include 2,2-bis(4-hydroxyphenyl)propane, 2,2-bis(3-methyl-4-hydroxyphenyl)propane, 1,1-bis(4-hydroxyphenyl)-1-phenylethane, 1,3-bis(2-(4-hydroxyphenyl)-2-propyl)benzene, 1,1-bis(4-hydroxyphenyl)-3,3,5-trimethylcyclohexane, 1,1-bis(4-hydroxyphenyl)cyclohexane, bis(4-hydroxyphenyl)diphenylmethane, 1,1-bis(4-hydroxyphenyl)decane, bis(4-hydroxyphenyl)sulfide, bis(4-hydroxy-3-methylphenyl)sulfide, biphenol, 9,9-bis(4-hydroxyphenyl)fluorene, 9,9-bis(4-hydroxy-3-methylphenyl)fluorene, 9,9-bis(4-hydroxy-3-cyclohexylphenyl)fluorene, 9,9-bis(4-hydroxy-3-phenylphenyl)fluorene, bis(4-hydroxyphenyl)sulfone and 10,10-bis(4-hydroxyphenyl)anthrone, with 2,2-bis(4-hydroxyphenyl)propane and bis(4-hydroxyphenyl)sulfide being particularly preferred. These may be used alone or in combinations of two or more.

(Diol Component of Formula (9))

The diol component as the starting material of formula (9) for the invention is primarily a diol component represented by formula (b), and a single type may be used alone or two or more different types may be used in combination.

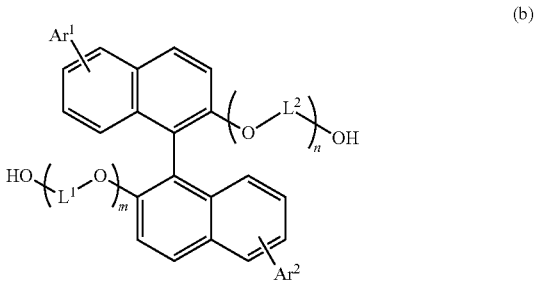

(b)

Here, $L^1$, $L^2$, m, n, $Ar^1$ and $Ar^2$ are the same as in formula (1).

When $Ar^1$ and $Ar^2$ are phenyl groups, the diol component of formula (b) may be 2,2'-bis(2-hydroxyethoxy)-3,3'-diphenyl-1,1'-binaphthalene, 2,2'-bis(2-hydroxyethoxy)-4,4'-diphenyl-1,1'-binaphthalene, 2,2'-bis(2-hydroxyethoxy)-5,5'-diphenyl-1,1'-binaphthalene, 2,2'-bis(2-hydroxyethoxy)-6,6'-diphenyl-1,1'-binaphthalene, 2,2'-bis(2-hydroxyethoxy)-7,7'-diphenyl-1,1'-binaphthalene or 2,2'-bis(2-hydroxyethoxy)-8,8'-diphenyl-1,1'-binaphthalene.

For example, the compound 2,2'-bis(2-hydroxyethoxy)-6,6'-diphenyl-1,1'-binaphthalene represented by formula (b1) (hereunder also referred to as "BHEB6") forms a conjugated structure between one fused polycyclic aromatic group (naphthyl group) of the binaphthalene backbone and the one monocyclic aromatic group (phenyl group) bonded to it by a single bond.

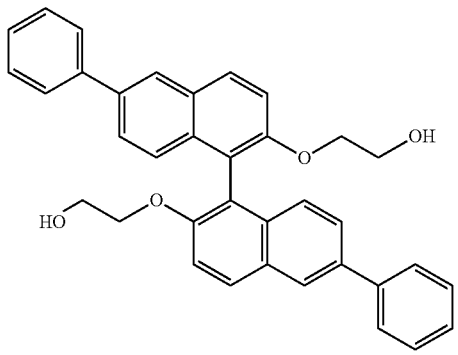

(b1)

When Ar¹ and Ar² are naphthyl groups, the diol component of formula (b) may be 2,2'-bis(2-hydroxyethoxy)-3,3'-di(1-naphthyl)-1,1'-binaphthalene, 2,2'-bis(2-hydroxyethoxy)-4,4'-di(1-naphthyl)-1,1'-binaphthalene, 2,2'-bis(2-hydroxyethoxy)-5,5'-di(1-naphthyl)-1,1'-binaphthalene, 2,2'-bis(2-hydroxyethoxy)-6,6'-di(1-naphthyl)-1,1'-binaphthalene, 2,2'-bis(2-hydroxyethoxy)-7,7'-di(1-naphthyl)-1,1'-binaphthalene, 2,2'-bis(2-hydroxyethoxy)-8,8'-di(1-naphthyl)-1,1'-binaphthalene, 2,2'-bis(2-hydroxyethoxy)-3,3'-di(2-naphthyl)-1,1'-binaphthalene, 2,2'-bis(2-hydroxyethoxy)-4,4'-di(2-naphthyl)-1,1'-binaphthalene, 2,2'-bis(2-hydroxyethoxy)-5,5'-di(2-naphthyl)-1,1'-binaphthalene, 2,2'-bis(2-hydroxyethoxy)-6,6'-di(2-naphthyl)-1,1'-binaphthalene, 2,2'-bis(2-hydroxyethoxy)-7,7'-di(2-naphthyl)-1,1'-binaphthalene or 2,2'-bis(2-hydroxyethoxy)-8,8'-di(2-naphthyl)-1,1'-binaphthalene.

For example, the compound 2,2'-bis(2-hydroxyethoxy)-6,6'-di(2-naphthyl)-1,1'-binaphthalene represented by formula (b2) forms a conjugated structure between the one fused polycyclic aromatic group (naphthyl group) of the binaphthalene backbone and the one fused polycyclic aromatic group (naphthyl group) bonded to it by a single bond.

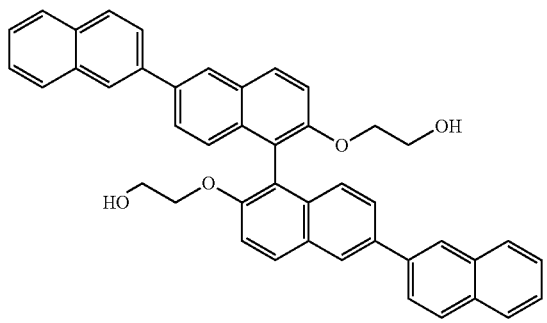 [SMILES: OCCOc1ccc2cc(-c3ccc4ccccc4c3)ccc2c1-c1c(OCCO)ccc2cc(-c3ccc4ccccc4c3)ccc12]

(Other Copolymerizing Components)

The thermoplastic resin may also have copolymerization of another diol component, to an extent that does not impair the properties according to the invention. The other diol component preferably constitutes less than 30 mol %, 20 mol % or less, 10 mol % or less or 5 mol % or less of the total repeating units.

Examples of other diol components to be used in the thermoplastic resin include ethylene glycol, propanediol, butanediol, pentanediol, hexanediol, heptanediol, octanediol, nonanediol, tricyclo[5.2.1.0$^{2,6}$]decanedimethanol, cyclohexane-1,4-dimethanol, decalin-2,6-dimethanol, norbornanedimethanol, pentacyclopentadecanedimethanol, cyclopentane-1,3-dimethanol, spiroglycol, isosorbide, isomannide, isoidide, hydroquinone, resorcinol, bis(4-(2-hydroxyethoxy)phenyl)sulfone, 1,1'-bi-2-naphthol, dihydroxynaphthalene and bis(2-hydroxyethoxy)naphthalene, any of which may be used alone or in combinations of two or more.

(Dicarboxylic Acid Component of Formula (1) or Formula (9))

A dicarboxylic acid component to be used as a unit represented by formula (1) or formula (9) in the thermoplastic resin is primarily preferred to be a dicarboxylic acid represented by HOOC—X—COOH, or an ester-forming derivative thereof. In this formula, X represents a divalent linking group for attachment of a unit represented by formula (1) or formula (9).

Specific typical examples of dicarboxylic acids or their ester-forming derivatives represented by the formula HOOC—X—COOH include compounds of formula (a) or (b) of the invention wherein the diol is a dicarboxylic acid or its ester-forming derivative.

Dicarboxylic acid components to be used in the thermoplastic resin of the invention include aliphatic dicarboxylic acid components such as malonic acid, succinic acid, glutaric acid, adipic acid, pimelic acid, suberic acid, azelaic acid, methylmalonic acid and ethylmalonic acid, monocyclic aromatic dicarboxylic acid components such as phthalic acid, isophthalic acid and terephthalic acid, polycyclic aromatic dicarboxylic acid components such as 2,6-naphthalenedicarboxylic acid, 2,7-naphthalenedicarboxylic acid, 2,3-naphthalenedicarboxylic acid, 1,4-naphthalenedicarboxylic acid, 1,8-naphthalenedicarboxylic acid, anthracenedicarboxylic acid, phenanthrenedicarboxylic acid, 2,2'-bis(carboxymethoxy)-1,1'-binaphthalene, 9,9-bis(carboxymethyl)fluorene, 9,9-bis(2-carboxyethyl)fluorene, 9,9-bis(1-carboxyethyl)fluorene, 9,9-bis(1-carboxypropyl)fluorene, 9,9-bis(2-carboxypropyl)fluorene, 9,9-bis(2-carboxy-1-methylethyl)fluorene, 9,9-bis(2-carboxy-1-methylpropyl)fluorene, 9,9-bis(2-carboxybutyl)fluorene, 9,9-bis(2-carboxy-1-methylbutyl)fluorene, 9,9-bis(5-carboxypentyl)fluorene and 9,9-bis(carboxycyclohexyl)fluorene, biphenyldicarboxylic acid components such as 2,2'-biphenyldicarboxylic acid, and alicyclic dicarboxylic acid components such as 1,4-cyclohexanedicarboxylic acid and 2,6-decalinedicarboxylic acid, with isophthalic acid, terephthalic acid, 2,6-naphthalenedicarboxylic acid and 2,2'-bis(carboxymethoxy)-1,1'-binaphthalene being preferred. These may be used alone or in combinations of two or more. As ester-forming derivatives there may be used acid chlorides, or esters such as methyl ester, ethyl ester or phenyl ester.

The thermoplastic resin of the invention is produced, for example, by a method of reacting a carbonate precursor such as phosgene or a carbonic acid diester with a diol component, or a method of reacting a dicarboxylic acid or its ester-forming derivative with a diol component. Specific examples are listed below.

<Method for Producing Thermoplastic Resin>

The polycarbonate resin, polyester carbonate resin or polyester resin of the invention is produced by commonly known reaction means for producing resins, such as a method of reacting a carbonate precursor such as a carbonic acid diester with a dihydroxy compound, in the case of a polycarbonate. The production method may be carried out with reference to PTL 3, except for using a monomer that provides a repeating unit satisfying aspect 1, such as formula (a) or (b).

(Method for Producing Polycarbonate)

When the thermoplastic resin is a polycarbonate, it is obtained by a conventionally known method in which a diol component and a carbonate precursor are reacted by interfacial polymerization or melt polymerization. A catalyst, end terminator, antioxidant or the like may also be used as necessary during production of the polycarbonate.

(Method for Producing Polyester)

When the thermoplastic resin is a polyester, the diol component and the dicarboxylic acid or its ester-forming derivative may be reacted by esterification or transesterification reaction, and the obtained reaction product may be subjected to polycondensation reaction to form a polymer of the desired molecular weight. This method may also employ a known protocol.

(Method for Producing Polyester Carbonate)

When the thermoplastic resin is a polyester carbonate, it may be produced by reacting a diol component and a dicarboxylic acid or its ester-forming derivative, with phosgene or a carbonate precursor such as a carbonic acid diester. The polymerization method used may be the same known method as used for a polycarbonate or polyester.

<Thermoplastic Resin—Impurities>

(Residual Phenol)

The residual phenol content of the thermoplastic resin is preferably 1 to 500 ppm, more preferably 1 to 400 ppm and even more preferably 1 to 300 ppm. The phenol content is preferably adjusted by the reaction time at a pressure of below 1.3 kPa. The phenol content increases when reaction is not conducted at a degree of vacuum of below 1.3 kPa. If the reaction time is too long, too much will tend to distill off from the resin.

The phenol content can be adjusted after the thermoplastic resin has been obtained. For example, it is possible to use a method of dissolving the thermoplastic resin in an organic solvent and rinsing the organic solvent layer with water, or a method of using a commonly used single-screw or twin-screw extruder or a kneading machine such as any of various types of kneaders, for devolatilization at a pressure of 133 to 13.3 Pa and a temperature of 200 to 320° C. With a suitable residual phenol content, it is possible to increase the molding fluidity without loss of heat resistance. In addition, the thermal stability during hot melting of the resin is also satisfactory, and die contamination during injection molding of the resin can also be prevented. Furthermore, while phenols tend to undergo coloration when oxidized, the color tone of the thermoplastic resin is less likely to be impaired and the molding fluidity is also satisfactory within this range.

(Residual Fluorenone)

The residual fluorenone content of the thermoplastic resin is preferably 1 to 500 ppm, more preferably 1 to 300 ppm, even more preferably 1 to 100 ppm and most preferably 1 to 50 ppm. If the residual fluorenone content in the thermoplastic resin is suitable it will be possible to prevent coloration of the resin.

Fluorenone is used as a starting material for production of monomers with fluorene-based units, and it remains if not completely removed during the production process. The present inventors have found that the residual amount of fluorenone is connected with coloration of the thermoplastic resin.

(Residual Palladium (Pd) Catalyst Amount)

The thermoplastic resin preferably does not include a palladium catalyst. The amount of residual palladium catalyst in the thermoplastic resin is preferably no greater than 10 ppm, and more preferably no greater than 5.0 ppm, no greater than 3.0 ppm, no greater than 1.0 ppm or 0.5 ppm, although it may be 0.0 ppm or greater, 0.1 ppm or greater, 0.2 ppm or greater or 0.5 ppm or greater. If the amount of residual palladium catalyst in the thermoplastic resin is suitable it will be possible to prevent coloration of the resin.

Palladium catalysts are used as catalysts for bonding aromatic substituents to fluorene-based component units or anthrone-based component units, or binaphthalene-based component units, and they commonly remain in thermoplastic resins that contain fluorene-based component units or anthrone-based component units that include aromatic substituents on side chains, and/or binaphthalene-based component units that include aromatic substituents. The present inventors have found that the residual amount of palladium catalyst is connected with coloration of a thermoplastic resin. In order to lower the amount of residual palladium in a resin, the palladium catalyst residue-containing monomer and/or resin may be subjected to palladium removal treatment.

<Additives>

Additives such as release agents, heat stabilizers, ultraviolet absorbers, blueing agents, antistatic agents, flame retardants, plasticizers and fillers may also be appropriately added to the thermoplastic resin composition containing a thermoplastic resin of the invention, as necessary.

Specific release agents and heat stabilizers that are preferred include those mentioned in International Patent Publication No. 2011/010741.

Particularly preferred release agents include stearic acid monoglyceride, stearic acid triglyceride, pentaerythritol tetrastearate, and mixtures of stearic acid triglyceride and stearyl stearate. The amount of ester in the release agent is preferably 90 mass % or greater and more preferably 95 mass % or greater, with 100 mass % as the amount of release agent. The release agent is added to the thermoplastic resin composition preferably in the range of 0.005 to 2.0 parts by mass, more preferably in the range of 0.01 to 0.6 part by mass and even more preferably in the range of 0.02 to 0.5 part by mass, with respect to 100 parts by mass of the thermoplastic resin.

Heat stabilizers include phosphorus-based heat stabilizers, sulfur-based heat stabilizers and hindered phenol-based heat stabilizers.

Particularly preferred phosphorus-based heat stabilizers for use are tris(2,4-di-tert-butylphenyl)phosphite, bis(2,6-di-tert-butyl-4-methylphenyl)pentaerythritol diphosphite and tetrakis(2,4-di-tert-butylphenyl)-4,4'-biphenylene diphosphonite. The content of the phosphorus-based heat stabilizer in the thermoplastic resin is preferably 0.001 to 0.2 part by mass with respect to 100 parts by mass of the thermoplastic resin.

A particularly preferred sulfur-based heat stabilizer is pentaerythritol-tetrakis(3-laurylthiopropionate). The content of a sulfur-based heat stabilizer in the thermoplastic resin is preferably 0.001 to 0.2 part by mass with respect to 100 parts by mass of the thermoplastic resin.

Preferred hindered phenol-based heat stabilizers are octadecyl-3-(3,5-di-tert-butyl-4-hydroxyphenyl)propionate and pentaerythritol-tetrakis[3-(3,5-di-tert-butyl-4-hydroxyphenyl)propionate].

The content of a hindered phenol-based heat stabilizer in the thermoplastic resin is preferably 0.001 to 0.3 part by mass with respect to 100 parts by mass of the thermoplastic resin.

A phosphorus-based heat stabilizer and a hindered phenol-based heat stabilizer may also be used in combination.

While it is not necessary to add an ultraviolet absorber to the thermoplastic resin composition, if an ultraviolet absorber is still added then it is preferably at least one type of ultraviolet absorber selected from the group consisting of benzotriazole-based ultraviolet absorbers, benzophenone-based ultraviolet absorbers, triazine-based ultraviolet absorbers, cyclic imino ester-based ultraviolet absorbers and cyanoacrylate-based ultraviolet absorbers.

More preferred benzotriazole-based ultraviolet absorbers are 2-(2-hydroxy-5-tert-octylphenyl)benzotriazole and 2,2'-methylenebis[4-(1,1,3,3-tetramethylbutyl)-6-(2H-benzotriazol-2-yl)phenol].

Benzophenone-based ultraviolet absorbers include 2-hydroxy-4-n-dodecyloxybenzophenone and 2-hydroxy-4-methoxy-2'-carboxybenzophenone.

Triazine-based ultraviolet absorbers include 2-(4,6-diphenyl-1,3,5-triazin-2-yl)-5-[(hexyl)oxy]-phenol and 2-(4,6-bis (2.4-dimethylphenyl)-1,3,5-triazin-2-yl)-5-[(octyl)oxy]-phenol.

A particularly suitable cyclic imino ester-based ultraviolet absorber is 2,2'-p-phenylenebis(3,1-benzoxazin-4-one).

Cyanoacrylate-based ultraviolet absorbers include 1,3-bis-[(2'-cyano-3',3'-diphenylacryloyl)oxy]-2,2-bis[(2-cyano-3,3-diphenylacryloyl)oxy]methyl)propane and 1,3-bis-[(2-cyano-3,3-diphenylacryloyl)oxy]benzene.

It is possible to add essentially no ultraviolet absorber, with the ultraviolet absorber in an amount of 3.0 parts by mass or lower, 2.0 parts by mass or lower, 1.0 parts by mass or lower, 0.5 parts by mass or lower, 0.3 parts by mass or lower, 0.1 parts by mass or lower or 0.01 parts by mass or lower, for example, with respect to 100 parts by mass of the thermoplastic resin.

Blueing agents include MACROLEX Violet B and MACROLEX Blue RR by Bayer Ltd., and Polysynthren Blue RLS by Clariant Japan. A blueing agent is effective for eliminating yellowishness of the thermoplastic resin. Particularly in the case of a thermoplastic resin composition that has been given weather resistance, addition of an ultraviolet absorber in a fixed amount currently tends to produce a yellowish color in the resin composition by the "action and color of the ultraviolet absorber", and therefore addition of a blueing agent is highly effective for imparting natural transparency to lenses.

The blueing agent content is preferably 0.05 to 1.5 ppm and more preferably 0.1 to 1.2 ppm with respect to 100 parts by mass of the thermoplastic resin.

<Optical Member>

The thermoplastic resin of the invention is suitable as an optical member, and particularly as an optical lens. The optical member may be a lens, prism, optical disk, transparent conductive panel, optical card, sheet, film, optical fiber, optical film, optical filter or hard coat film, and it is especially highly useful as an optical lens.

<Optical Lens>

When an optical lens of the invention is to be produced by injection molding, molding is preferably carried out under conditions with a cylinder temperature of 230 to 350° C. and a mold temperature of 70 to 180° C. More preferably, molding is carried out under conditions with a cylinder temperature of 250 to 300° C. and a mold temperature of 80 to 170° C. When the cylinder temperature is higher than 350° C. the thermoplastic resin tends to decompose and undergo coloration, and when it is lower than 230° C. the melt viscosity increases, tending to hamper molding. Also, when the mold temperature is higher than 180° C., it tends to become difficult to remove molded pieces composed of the thermoplastic resin from the die. When the mold temperature is below 70° C., on the other hand, the resin hardens too quickly inside the die during molding, making it difficult for the molded piece shape to be controlled or tending to make it difficult for the mold shape of the die to be transferred.

It is preferred to use an aspherical lens shape, as necessary, for an optical lens of the invention. An aspherical lens allows spherical aberration to be reduced to essentially zero with a single lens, thus making it unnecessary to eliminate spherical aberration by a combination of multiple spherical lenses, and allowing the weight to be reduced and the molding cost to be reduced. Therefore, an aspherical lens is useful among optical lenses, particularly as a camera lens.

Specifically, the lens size is such that the center section thickness is 0.05 to 3.0 mm, more preferably 0.05 to 2.0 mm and even more preferably 0.1 to 2.0 mm. The diameter is 1.0 mm to 20.0 mm, more preferably 1.0 to 10.0 mm and more preferably 3.0 to 10.0 mm. A meniscus lens is preferred, having a shape which is convex on one side and concave on the other side.

An optical lens of the invention is molded by any desired method such as die molding, shaving, polishing, laser working, electrical discharge machining or etching. Die molding is more preferred among these, from the viewpoint of production cost.

EXAMPLES

The invention will now be described in greater detail by examples, with the understanding that they are not restrictive on the invention.

<Evaluation Methods>

<Refractive Index>

After dissolving 3 g of an obtained resin in 50 ml of dichloromethane, the solution was cast onto a glass dish. After thoroughly drying at room temperature, it was dried for 8 hours at a temperature of 120° C. or below to prepare a film with a thickness of approximately 100 μm. The refractive index nD of the film at 25° C. (wavelength: 589 nm) was measured using a DR-M2 Abbe refractometer by Atago Co.

<Light Transmittance>

A 6.7 mg portion of the obtained resin was dissolved in 5 mL of dichloromethane (specific gravity: 1.33 g/mL) to prepare a 0.1 mass % solution. The transmittance of the solution was measured from 250 nm to 780 nm using an U-3310 spectrophotometer by Hitachi, Ltd.

PRODUCTION EXAMPLES (1) Synthesis of BPDP2 (9,9-bis(4-(2-hydroxyethoxy)phenyl)-2,7-diphenylfluorene)

(1-1) Synthesis of BPDB2 (9,9-bis(4-(2-hydroxyethoxy)phenyl)-2,7-bromofluorene)

After charging 150 g of toluene as a solvent and 2.19 g of 12-phosphotungstic(VI) acid n-hydrate ($H_3[PW_{12}O_{40}] \cdot nH_2O$) into a 500 mL flask equipped with a stirrer, cooler and thermometer, azeotropic dehydration was carried out with toluene circulation. After cooling the contents, 33.8 g (0.10 mol) of 2,7-dibromofluorenone (hereunder also abbreviated as DBFN) and 55.3 g (0.40 mol) of 2-phenoxyethanol were added, and the mixture was stirred with toluene circulation while the water generated by the reaction was discharged out of the system. Progression of the reaction was appropriately confirmed by HPLC, and the reaction was completed upon confirming a DBFN residue amount of no greater than 0.1 mass %. The obtained target intermediate product (BPDB2) was used directly in the reaction of the following step 1-2 without isolation or purification.

(1-2) Synthesis of BPDP2

Figure 2:
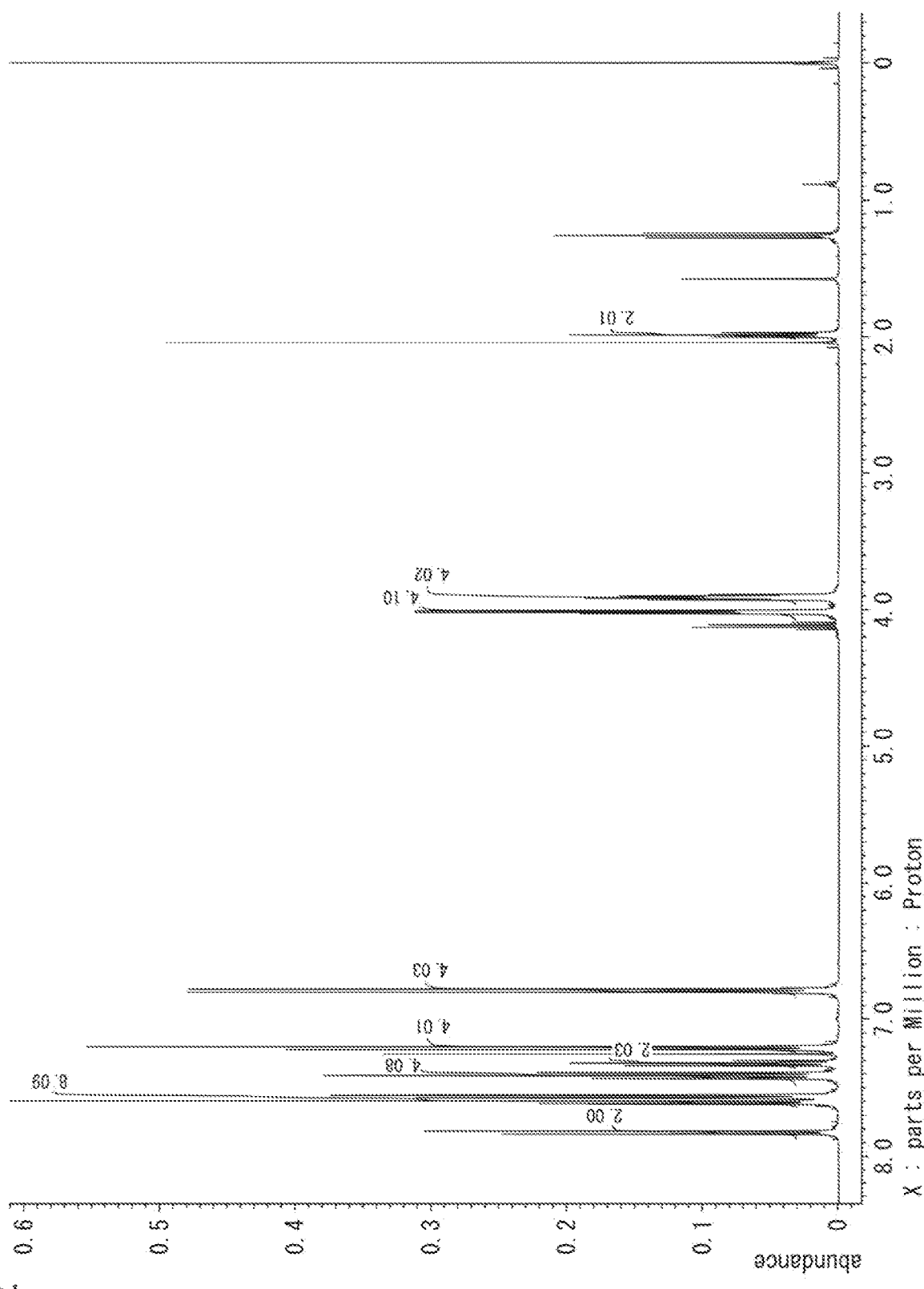
FIG. 2 shows $^1$H NMR results for BPDP2 (9,9-bis(4-(2-hydroxyethoxy)phenyl)-2,7-diphenylfluorene).

After cooling the reaction mixture obtained in step 1-1 to room temperature, 85 mL of a 2 M potassium carbonate aqueous solution, 25.6 g (0.21 mol) of phenylboronic acid and 1.12 g (0.97 mmol) of tetrakis(triphenylphosphine) palladium were added, and the mixture was stirred at 80° C. for 2 hours for reaction. Progression of the reaction was appropriately confirmed by HPLC, and the reaction was completed upon confirming an intermediate target product residue amount of no greater than 0.1 mass %. The obtained reaction mixture was cooled to room temperature, and after adding ethanol to produce crystallization, the solid was filtered and collected. The collected solid was dissolved in chloroform and rinsed 3 times with hot water, after which the chloroform layer was subjected to decoloration treatment with active carbon and treated for palladium removal, and subsequently concentrated to obtain a partially purified product. The obtained solid partially purified product was recrystallized from toluene to obtain 41.3 g of the final target product as a white solid (70% yield). The obtained white solid was analyzed by $^1$H NMR and confirmed to be the target substance (FIG. 2). The solvent used was $CDCl_3$.

(2) Synthesis of BNDP2 (9,9-bis(6-(2-hydroxy-ethoxy)-2-naphthyl)-2,7-diphenylfluorene)

A white solid of BNDP2 was obtained in an amount of 51.1 g (74% yield) in the same manner as BPDP2 above, except that the 2-phenoxyethanol in step 1-1 was changed to 2-naphthoxyethanol. The obtained white solid was analyzed by t H NMR and confirmed to be the target substance. The solvent used was $CDCl_3$.

(3) Synthesis of BPDN1 (9,9-bis(4-(2-hydroxy-ethoxy)phenyl)-2,7-di(1-naphthyl)fluorene)

A white solid of BPDN1 was obtained in an amount of 55.3 g (40% yield) in the same manner as the synthesis of BPDP2 above, except that the phenylboronic acid in step 1-2 was changed to I-naphthaleneboronic acid. The obtained white solid was analyzed by $^1$H NMR and confirmed to be the target substance. The solvent used was $CDCl_3$.

(4) Synthesis of BPDN2 (9,9-bis(4-(2-hydroxy-ethoxy)phenyl)-2,7-di(2-naphthyl)fluorene)

A white solid of BPDN2 was obtained in an amount of 39.4 g (57% yield) in the same manner as the synthesis of BPDP2 above, except that the phenylboronic acid in step 1-2 was changed to 2-naphthaleneboronic acid. The obtained white solid was analyzed by $^1$H NMR and confirmed to be the target substance. The solvent used was $CDCl_3$.

(5) Synthesis of BPDT2 (9,9-bis(4-(2-hydroxy-ethoxy)phenyl)-2,7-di(2-thienyl)fluorene)

A faint yellow solid of BPDT2 was obtained in an amount of 40.4 g (67% yield) in the same manner as the synthesis of BPDP2 above, except that the phenylboronic acid in step 1-2 was changed to 2-thipheneboronic acid. The obtained faint yellow solid was analyzed by $^1$H NMR and confirmed to be the target substance. The solvent used was $DMSO-d_6$.

(6) Synthesis of BNDN2 (9,9-bis(6-(2-hydroxy-ethoxy)-2-naphthyl)-2,7-di(2-naphthyl)fluorene)

A white solid of BNDN2 was obtained in an amount of 26.9 g (34% yield) in the same manner as the synthesis of BPDP2 above, except that the 2-phenoxyethanol in step 1-1 was changed to 2-naphthoxyethanol and the phenylboronic acid in step 1-2 was changed to 2-naphthaleneboronic acid. The obtained white solid was analyzed by $^1$H NMR and confirmed to be the target substance. The solvent used was $CDCl_3$.

(7) Synthesis of BHEB6 (2,2'-bis(2-hydroxy-ethoxy)-6,6'-diphenyl-1,1'-binaphthalene)

(7-1) Synthesis of 2,2'-bis(2-hydroxyethoxy)-6,6'-dibromo-1,1'-binaphthalene

After charging 5.0 g (11.3 mmol) of 6,6'-dibromo-1,1'-bi-2-naphthol (hereunder also abbreviated as BN-6Br), 2.3 g (25.9 mmol) of ethylene carbonate, 0.16 g (1.9 mmol) of potassium carbonate and 15 g of toluene into a flask equipped with a stirrer, cooler and thermometer, reaction was conducted at 110° C. for 5 hours. Progression of the reaction was appropriately confirmed by HPLC, and the reaction was completed upon confirming a BN-6Br residue amount of no greater than 0.1 mass %. After then adding 65 g of toluene to the obtained reaction mixture for dilution, 8 g of a 10 mass % aqueous sodium hydroxide solution was added, the mixture was stirred at 85° C. for 1 hour and the aqueous layer was removed by separatory funnel. After concentrating the organic layer, it was dissolved in ethyl acetate and rinsed, and the aqueous layer was removed by separatory funnel. As a result of further addition of hexane and direct recrystallization, the target compound 2,2'-bis(2-hydroxyethoxy)-6,6'-dibromo-1,1'-binaphthalene (hereunder also abbreviated as BN2EO-6Br) was obtained as a white solid in an amount of 3.7 g (61% yield). The obtained sample was used directly in the reaction of step 7-2.

(7-2) Synthesis of BHEB6

After charging 3.5 g (6.6 mmol) of the BN2EO-6Br obtained in step 7-1, 2.1 g (16.5 mmol) of phenylboronic acid, 0.112 g (0.1 mmol) of tetrakis(triphenylphosphine) palladium, 9 mL of a 2 M aqueous potassium carbonate solution, 33 mL of toluene and 12 mL of ethanol into a flask equipped with a stirrer, cooler and thermometer under a nitrogen atmosphere, reaction was conducted at 80° C. for 2 hours. Progression of the reaction was appropriately confirmed by HPLC, and the reaction was completed upon confirming a BN2EO-6Br residue amount of no greater than 0.1 mass %. After concentrating the obtained reaction mixture, a 1 M aqueous sodium hydroxide solution was added and extraction was performed with chloroform. Active carbon was added to the obtained organic layer and the mixture was stirred for 1 hour, after which the active carbon was filtered out and the organic layer was concentrated. After concentration it was purified by silica gel column chromatography to obtain 2.6 g of the target compound BHEB6 as white crystals (75% yield). The obtained white solid was analyzed by $^1$H NMR and confirmed to be the target substance. The solvent used was $CDCl_3$.

Example 1

After placing 8.85 parts by mass of the synthesized BPDP2, 26.31 parts by mass of BPEF, 16.23 parts by mass of diphenyl carbonate (hereunder also abbreviated as DPC) and $3.00 \times 10^{-5}$ parts by mass of sodium hydrogencarbonate in a jacketed reaction vessel equipped with a stirrer and distillation device, nitrogen exchange was carried out 3 times, and the jacket was heated to 180° C. to melt the starting materials. After complete dissolution, the pressure was reduced to 20 kPa over a period of 5 minutes while simultaneously increasing the temperature of the jacket to 260° C. at a rate of 60° C./hr, for transesterification reaction. The jacket was then kept at 260° C. while reducing the pressure to 0.13 kPa over a period of 50 minutes, and polymerization reaction was carried out under conditions of 260° C., <0.13 kPa until a predetermined torque of the stirrer was reached. Upon completion of the reaction, the produced resin was extruded while being pelletized, to obtain polycarbonate resin pellets. The physical properties of the obtained polycarbonate resin are shown in Table 1.

Examples 2 to 7 and Comparative Examples 1 to 6

Polycarbonate resin pellets were obtained for Examples 2 to 7 and Comparative Examples 1 to 6, changing the composition of Example 1 as shown in Table 1.

Results

The evaluation results for the polycarbonate resin examples are shown in Table 1. FIG. 1 shows the transmission spectra for Examples 1 to 3 and Comparative Examples 1 to 3.

TABLE 1

| | Polycarbonate compositional ratio [mol %] | | | | | | | | |
|---|---|---|---|---|---|---|---|---|---|
| | Diol of formula (a) | | | | | | Diol of formula (b) | Other diol | |
| | BPDP2 | BNDP2 | BPDN1 | BPDN2 | BPDT2 | BNDN2 | BHEB6 | BPEF | BPA |
| Example 1 | 20 | | | | | | | 80 | |
| Example 2 | | 50 | | | | | | 50 | |
| Example 3 | | | 50 | | | | | 50 | |
| Example 4 | | | | 20 | | | | 80 | |
| Example 5 | | | | | 20 | | | 80 | |
| Example 6 | | | | | | 20 | | 80 | |
| Example 7 | | | | | | | 20 | 80 | |
| Comp. Example 1 | | | | | | | | | 100 |
| Comp. Example 2 | | | | | | | | 100 | |
| Comp. Example 3 | | | | | | | | | |
| Comp. Example 4 | | | | | | | | 80 | |
| Comp. Example 5 | | | | | | | | 80 | |
| Comp. Example 6 | | | | | | | | 80 | |

| | Polycarbonate compositional ratio [mol %] | | | | Evaluation | | |
|---|---|---|---|---|---|---|---|
| | Other diol | | | | | Transmittance | Transmittance |
| | BOPPEF | BNEF | BPEB | BHEB | ND | at 355 nm [%] | at 500 nm [%] |
| Example 1 | | | | | 1.648 | 2 | 100 |
| Example 2 | | | | | 1.682 | 0 | 100 |
| Example 3 | | | | | 1.671 | 0 | 100 |
| Example 4 | | | | | 1.665 | 0 | 100 |
| Example 5 | | | | | 1.659 | 0 | 99 |
| Example 6 | | | | | 1.674 | 0 | 100 |
| Example 7 | | | | | 1.654 | 7 | 100 |
| Comp. Example 1 | | | | | 1.583 | 100 | 100 |
| Comp. Example 2 | | | | | 1.638 | 100 | 100 |
| Comp. Example 3 | 100 | | | | 1.656 | 100 | 100 |
| Comp. Example 4 | | 20 | | | 1.649 | 99 | 100 |
| Comp. Example 5 | | | 20 | | 1.641 | 77 | 100 |

TABLE 1-continued

| Comp. Example 6 | 20 | 1.645 | 90 | 100 |
|---|---|---|---|---|

BPDP2: 9,9-bis(4-(2-hydroxyethoxy)phenyl)-2,7-diphenylfluorene
BNDP2: 9,9-bis(6-(2-hydroxyethoxy)-2-naphthyl)-2,7-diphenylfluorene
BPDN1: 9,9-bis(4-(2-hydroxyethoxy)phenyl)-2,7-di(1-naphthyl)fluorene
BPDN2: 9,9-bis(4-(2-hydroxyethoxy)phenyl)-2,7-di(2-naphthyl)fluorene
BPDT2: 9,9-bis(4-(2-hydroxyethoxy)phenyl)-2,7-di(2-thienyl)fluorene
BNDN2: 9,9-bis(6-(2-hydroxyethoxy)-2-naphthyl)-2,7-di(2-naphthyl)fluorene
BHEB6: 2,2'-bis(2-hydroxyethoxy)-6,6'-diphenyl-1,1'-binaphthalene
BPEF: 9,9-bis(4-(2-hydroxyethoxy)phenyl)fluorene
BPA: bisphenol A
BOPPEF: 9,9-bis(4-(2-hydroxyethoxy)-3-phenylphenyl)fluorene
BNEF: 9,9-bis(6-(2-hydroxyethoxy)-2-naphthyl)fluorene
BPEB: 9,9-bis(4-(2-hydroxyethoxy)phenyl)-benzo[b]fluorene
BHEB: 2,2'-bis(2-hydroxyethoxy)-1,1'-binaphthalene The thermoplastic resins of Examples 1 to 7 had very high refractive indexes and low ultraviolet transmittance, while also exhibiting very high visible light transparency.

The invention claimed is:

1. A thermoplastic resin comprising a spatial structural component unit,
    wherein the spatial structural component is a repeating unit derived from a diol compound represented by the following formula (a14) and/or a repeating unit represented by the following formula (9):

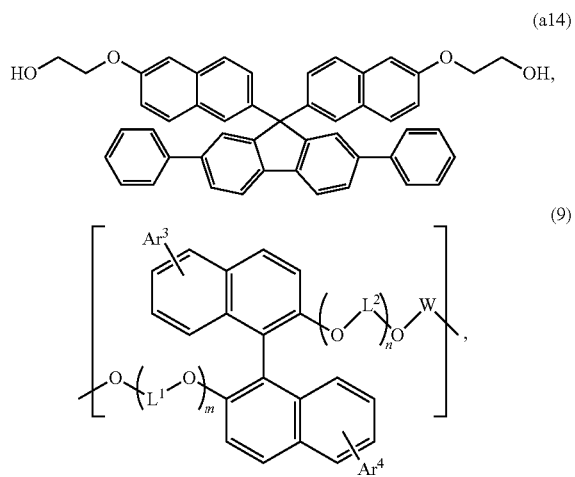

(a14)

(9)

wherein $Ar^3$ and $Ar^4$ represent a phenyl group, $L^1$ and $L^2$ each independently represent a divalent linking group, m and n each independently represent 0 or 1, and W is at least one group selected from groups represented by the following formula (2) or (3):

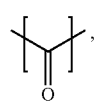

(2)

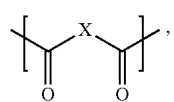

(3)

wherein X represents a divalent linking group, in a 0.1 mass % dichloromethane solution, the light transmittance at a wavelength of 355 nm is lower than 20% and the light transmittance at a wavelength of 500 nm is 90% or higher, and when the thermoplastic resin comprises the repeating unit represented by the formula (9), the repeating unit represented by formula (9) is included at 10 mol % or greater and 20 mol % or less, based on the total repeating units.

2. The thermoplastic resin according to claim 1, which contains the spatial structural component unit at 10 mol % or greater of the total units.

3. The thermoplastic resin according to claim 1, wherein formula (9) is selected from the group consisting of units represented by the following formula (9-1):

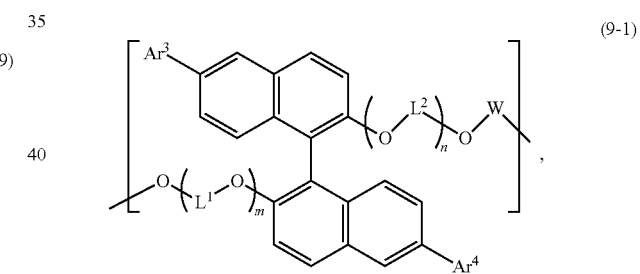

(9-1)

wherein $Ar^3$ and $Ar^4$, $L^1$ and $L^2$, m and n and W are the same as in formula (9) above.

4. The thermoplastic resin according to claim 1, wherein the refractive index nD is 1.640 or greater.

5. The thermoplastic resin according to claim 1, wherein a specific viscosity is 0.12 to 0.40.

6. The thermoplastic resin according to claim 1, wherein the glass transition temperature is 130 to 170° C.

7. The thermoplastic resin according to claim 1, which is a polyester, polyester carbonate or polycarbonate.

8. An optical member comprising a thermoplastic resin according to claim 1.

9. The optical member according to claim 8, which is an optical lens.

10. The thermoplastic resin according to claim 1, which is a polyester carbonate.

* * * * *